US010451957B2

(12) United States Patent
Sakai

(10) Patent No.: US 10,451,957 B2
(45) Date of Patent: Oct. 22, 2019

(54) IMAGING APPARATUS, CONTROL METHOD FOR THE IMAGING APPARATUS, AND STORAGE MEDIUM

(71) Applicant: CANON KABUSHIKI KAISHA, Tokyo (JP)

(72) Inventor: Masanori Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 15/806,425

(22) Filed: Nov. 8, 2017

(65) Prior Publication Data

US 2018/0136543 A1    May 17, 2018

(30) Foreign Application Priority Data

Nov. 14, 2016   (JP) ................................. 2016-221118

(51) Int. Cl.
*G03B 9/64*   (2006.01)
*G03B 7/26*   (2006.01)
*G03B 9/40*   (2006.01)

(52) U.S. Cl.
CPC ................. *G03B 9/64* (2013.01); *G03B 7/26* (2013.01); *G03B 9/40* (2013.01)

(58) Field of Classification Search
CPC ............... G03B 9/64; G03B 9/40; G03B 7/26
See application file for complete search history.

(56) References Cited

U.S. PATENT DOCUMENTS

| | | | | |
|---|---|---|---|---|
| 2003/0161624 A1* | 8/2003 | Toyoda | ..................... | G03B 9/40 396/487 |
| 2009/0028545 A1* | 1/2009 | Sakai | ....................... | G03B 9/32 396/480 |
| 2010/0067897 A1* | 3/2010 | Sakai | ....................... | G03B 9/08 396/484 |
| 2012/0229687 A1* | 9/2012 | Lee | ....................... | H04N 5/2353 348/333.11 |
| 2012/0249867 A1* | 10/2012 | Sakoda | ................ | H04N 5/2252 348/374 |
| 2012/0251094 A1* | 10/2012 | Wakikawa | ................ | G03B 9/16 396/463 |
| 2013/0251359 A1* | 9/2013 | Sakai | ....................... | G03B 9/62 396/467 |
| 2014/0168457 A1* | 6/2014 | Shintani | ................... | G03B 9/20 348/220.1 |
| 2014/0270748 A1* | 9/2014 | Sakai | ....................... | G03B 9/36 396/447 |

FOREIGN PATENT DOCUMENTS

JP    2014-178597 A    9/2014

* cited by examiner

*Primary Examiner* — Timothy J Henn
(74) *Attorney, Agent, or Firm* — Cowan, Liebowitz & Latman, P.C.

(57) ABSTRACT

An imaging apparatus includes a controller configured to control a motor and an image sensor. The controller rotates the motor in a first direction as reading of a signal corresponding to first imaging starts for one frame using the image sensor, and charges the first urging member and the blade member. The controller rotates the motor in a second direction reverse to the first direction after a charge of the blade member by the first urging member is completed, completes reading the signal corresponding to the first imaging before opening the exposure opening, and stops rotating the motor in the second direction.

13 Claims, 28 Drawing Sheets

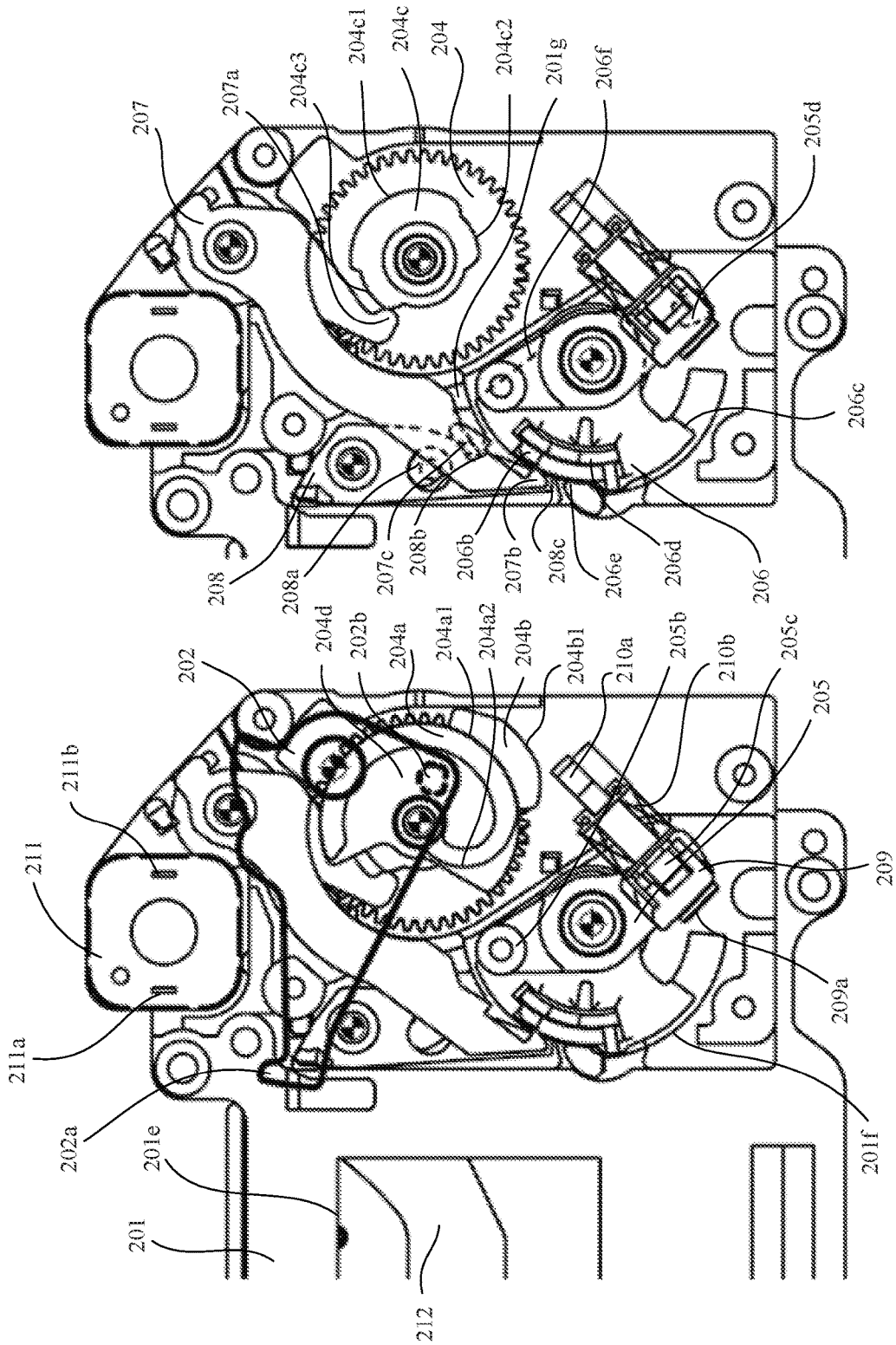

IMAGING APPARATUS, CONTROL METHOD FOR THE IMAGING APPARATUS, AND STORAGE MEDIUM

BACKGROUND OF THE INVENTION

Field of the Invention

The present invention relates to an imaging apparatus (or image capturing apparatus) having a shutter unit.

Description of the Related Art

There has conventionally been known an imaging apparatus, such as a digital camera, having a function (live-view function) of displaying an object image captured oy an image sensor, on a monitor such as an LCD (liquid crystal display unit), as a finder image to observe the object in imaging.

Japanese Patent Laid-Open No. ("JP") 2014-178597 discloses an imaging apparatus that uses a focal plane shutter and an electronic shutter for an imaging action (or an image capturing action). The imaging apparatus disclosed in JP 2014-178597 starts an exposure operation by an electric charge accumulation starting scan in the image sensor, and ends the exposure operation by running a rear curtain blade unit that includes a mechanical shutter. In addition, the imaging apparatus disclosed in JP 2014-118597 executes continuous image capturing) through a single motor by combining a forward rotation with a reverse rotation of the motor, in which an up state of a main mirror is maintained and only the back curtain blade unit is driven.

However, the imaging apparatus disclosed in JP 2014-178597 has a low continuous capturing speed since there are many periods in which the motor stops or decelerates in the continuous capturing in the live view. More specifically, there are totally three stop/deceleration periods, such as a live-view charge completion phase, a read standby phase, and a live-view imaging bound lock phase from a charge operation start in the live-view to an exposure action for the next live-view.

SUMMARY OF THE INVENTION

The present invention attempts to restrain an imaging speed from lowering in continuous capturing in live-view.

An imaging apparatus according to one aspect of the present invention includes a blade member configured to open and close an exposure opening, a drive member configured to drive the blade member, a first urging member configured to change the blade member to a charge state according to a rotation of the drive member, a motor configured to drive the drive member, an image sensor located at a position corresponding to the exposure opening, and a controller configured to control the motor and the image sensor. The controller rotates the motor in a first direction as reading of a signal corresponding to first imaging starts for one frame using the image sensor, and charges the first urging member and the blade member. The controller rotates the motor in a second direction reverse to the first direction after a charge of the blade member by the first urging member completed, completes reading the signal corresponding to the first imaging before opening the exposure opening, and stops rotating the motor in the second direction.

Further features of the present invention will become apparent from the following description of exemplary embodiments with reference to the attached drawings.

BRIEF DESCRIPTION OF THE DRAWINGS

FIGS. 22A and 22B are plane views that illustrate an unfixed moment in the post-live-charge opening release operation in the shutter unit according to this embodiment.

DESCRIPTION OF THE EMBODIMENTS

Figure 1:
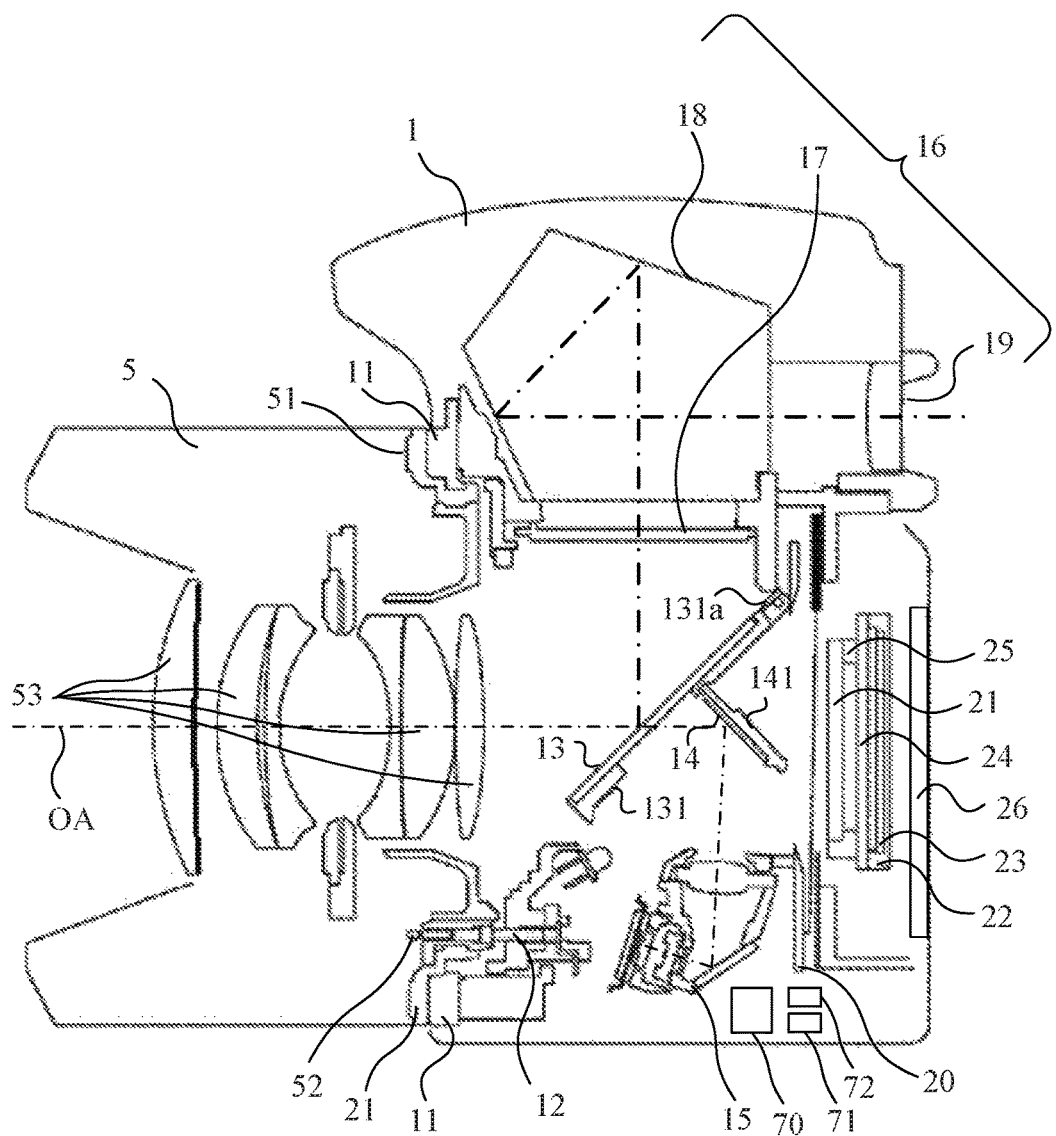
FIG. 1 is a central sectional view of a digital single-lens reflex camera body as an imaging apparatus and an interchangeable lens according to this embodiment.

Referring now to the accompanying drawings, a detailed description will be given of embodiments of the present invention. The same elements in each figure will be designated by the same reference numerals, and a duplicate description thereof will be omitted.

Figure 2:
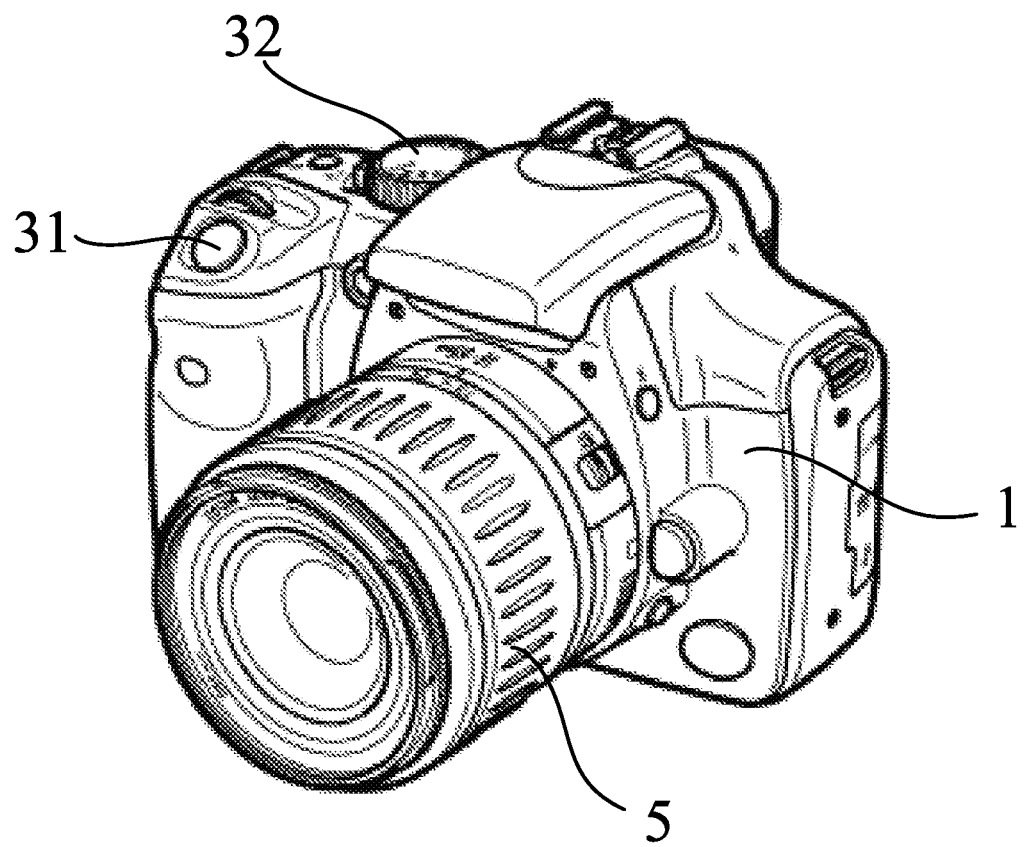
FIG. 2 is a perspective view of the digital single-lens reflex camera body as the imaging apparatus and the interchangeable lens according to this embodiment.

FIG. 1 is a central sectional view of a digital single-lens reflex camera body 1 as an imaging apparatus according to this embodiment (referred to as a "camera" hereinafter) and an interchangeable lens 5, and FIG. 2 is a perspective view of the camera 1 and the interchangeable lens 5.

The interchangeable lens 5 is detachably fixed onto the camera 1 via a mount part 11 on the camera 1 side and a mount part 51 on an interchangeable lens 5 side. When the interchangeable lens 5 is mounted onto the camera 1, a contact portion 12 in the camera 1 and a contact portion 52 in the interchangeable lens 5 are electrically connected to each other. Thereby, the camera 1 detects the attachment of the interchangeable lens 5. In addition, the power is supplied from the camera 1 to the interchangeable lens 5 and the camera 1 communicates with the interchangeable lens 5 so as to control the interchangeable lens 5 via the contact portions 12 and 52. While this embodiment describes a configuration of the interchangeable lens 5 attachable to and detachable from the camera 1, the camera 1 and the interchangeable lens 5 may be integrated with each other.

A light flux that has transmitted through a focus lens 53 in the interchangeable lens 5 enters a main mirror 13 in the camera 1. The main mirror 13 is held by a main mirror holder frame 131, and rotatably supported by a rotary shaft part 131a between a mirror up position (a first position) and a mirror down position (a second position). The main mirror 13 is a half-mirror, and the light flux that has transmitted through the main mirror 13 is downwardly reflected by a sub mirror 14, and led to a focus detection unit 15. The sub mirror 14 is held by a sub mirror holder frame 141. The sub mirror holder frame 141 is pivotably supported by an unillustrated hinge shaft around the main mirror holder frame 131.

The focus detection unit 15 detects a defocus amount of a focus lens 53, and calculates a drive amount of the focus lens 53 necessary for an in-focus state. The interchangeable lens 5 receives a calculated drive amount through the contact portions 12 and 52. The interchangeable lens 5 controls an (unillustrated) motor based on the received drive amount, and drives the focus lens 53 for focusing.

The light flux reflected on the main mirror 13 is led to an optical finder 16. The optical finder 16 includes a focus plate 17, a pentaprism 18, and an ocular lens 19. A light flux guided to the optical finder 16 by the main mirror 13 forms an object image on the focus plate 17. The user can observe the object image on the focus plate 17 through the pentaprism 18 and the ocular lens 19.

A shutter unit 20 is disposed behind the sub mirror 14. An optical low-pass filter 21, an image sensor holder 22, an image sensor 23, a cover member 24, and a rubber member 25 are arranged behind the shutter unit 20. The light flux that has transmitted through the optical low-pass filter 21 enters the image sensor 23 in imaging. The image sensor holder 22 is fixed onto a housing of the camera 1 by (unillustrated) screws. The image sensor 23 includes a CCD sensor, a CMOS sensor, or the like, and photoelectrically converts the optical image formed by the lens 1 (imaging optical system), and outputs image data. The image sensor 23 is held by the image sensor holder 22. The cover member 24 protects the image sensor 23. The rubber member 25 holds the optical low-pass filter 21 as well as making airtight a space between the optical low-pass filter 21 and the image sensor 23. The display monitor 26 is a monitor unit that includes an LCD (liquid crystal display unit) etc. and displays a captured image and various set states of the camera 1.

A release button (release switch) 31 is a two-stage switch to instruct a photometric start, a focus detection start, and image capturing. When the release button 31 is lightly pressed to the first stage or "half-pressed" (SW1), the photometry and the focus detection are performed. When the release button 31 is further pressed down to the second stage from the half-pressed state or "fully pressed" (SW2), the shutter unit 20 is driven and an image is captured. According to this embodiment, the camera 1 is configured to input the imaging preparation command (SW1) of the object and the imaging command (SW2) using the release button 31, but the present invention is not limited to this embodiment. For example, SW1 and SW2 commands may be input through the display monitor 26 in the following live-view imaging mode, where the display monitor 26 is a touch panel.

A mode dial switch 32 selects one of a variety of imaging modes for the camera 1. A controller 70 includes a CPU, and controls each component, such as the shutter unit 20 and the image sensor 23. A ROM 71 is a storage unit (memory) configured to store a control program to be executed by the controller 70 and various parameters. A RAM 72 serves as a work memory when the controller 70 executes the control program.

Figure 3:
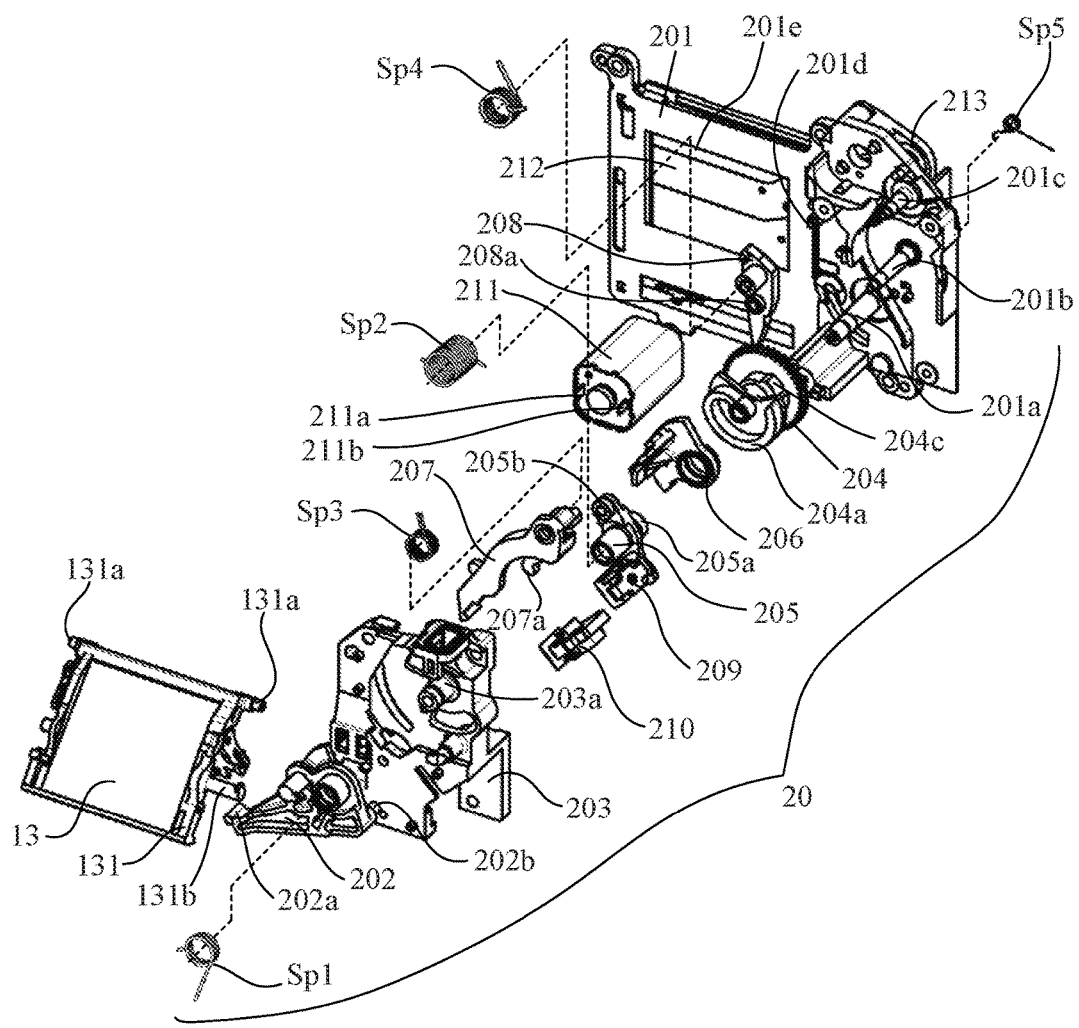
FIG. 3 is an exploded perspective view of the shutter unit according to this embodiment.

FIG. 3 is an exploded perspective view of the shutter unit 20 and the main mirror 13. A shutter base plate 201 is fixed onto an (unillustrated) mirror box in the camera 1 and includes components of a drive component for a rear curtain blade unit (blade member) 212. The shutter base plate 201 has an opening (exposure opening) 201e through which an object light flux passes. The opening 201e closes when the rear curtain blade unit 212 is unfolded, and opens when the rear curtain blade unit 212 is folded. The opening 201e is usually closed.

A mirror driving lever (mirror driving member) 202 is rotatably supported around a shaft 203a of an MG base plate 203 as the center. A contact portion 202a formed on the mirror driving lever 202 contacts a shaft 131b as a driven member in a main mirror holder frame 131. The main mirror holder frame 131 is forced by an (unillustrated) spring so as to follow a movement of the mirror driving lever 202.

A cam gear (cam member) 204 is rotatably supported around a shaft 201b formed on the shutter base plate 201 as a center. A rear curtain driving lever (driving member) 205 is rotatably supported around a shaft 201a formed on the shutter base plate 201 as a center. The rear curtain driving lever 205 includes a cylindrical member 205a, and a blade lever (blade moving member) 206 is rotatably supported on the cylindrical member 205a. The blade lever 206 rotates between a closed position where the rear curtain blade unit 212 closes the opening 201e and an open position where the rear curtain blade unit 212 opens the opening 201e.

A fixing lever (engaging member) 207 is rotatably supported around a shaft 201c as a center formed on the shutter base plate 201. A cam follower 207a provided to the fixing lever 207 contacts a fixing cam 204c provided to the cam gear 204. As the cam gear 204 rotates, the cam follower 207a traces the fixing cam 204c and the fixing lever 207 swings.

A bound lock lever (restricting member) 208 is rotatably supported around a shaft 201d as a center formed on the shutter base plate 201. When the fixing lever 207 presses a roller 208a provided to the bound lock lever 208, the bound lock lever 208 rotates. The bound lock lever 208 moves between a restricting position for restricting a movement of the blade lever 206 and a release position for releasing a movement restriction of the blade lever 206.

An armature 209 is provided to the rear curtain driving lever 205, and to an electromagnet 210 is provided to the MG base plate 203. The electromagnet 210 includes a yoke 210a, and a coil 210b provided to an outer circumference of the yoke 210a. When the voltage is applied to the coil 210b, a magnetic force is generated in the yoke 210a and the yoke 210a and the armature 209 can absorb each other due to this magnetic force.

A motor 211 is attached to the shutter base plate 201. A driving force of the motor 211 is transmitted to the cam gear 204 through a gear train 213 arranged on the backside of the shutter base plate 201, and the cam gear 204 rotates. Due to this rotation, the mirror driving lever 202, the rear curtain driving lever 205, the blade lever 206, the fixing lever 207, and the hound lock lever 208 rotate, the main mirror 13 rotates, and the rear curtain blade unit 212 reciprocates. The motor 211 includes terminals 211a and 211b. When the voltage is applied to the terminals 211a and 211b are set so as to switch the current direction in the motor 211, the rotating direction of the motor 211 can be switched.

Figure 4A:
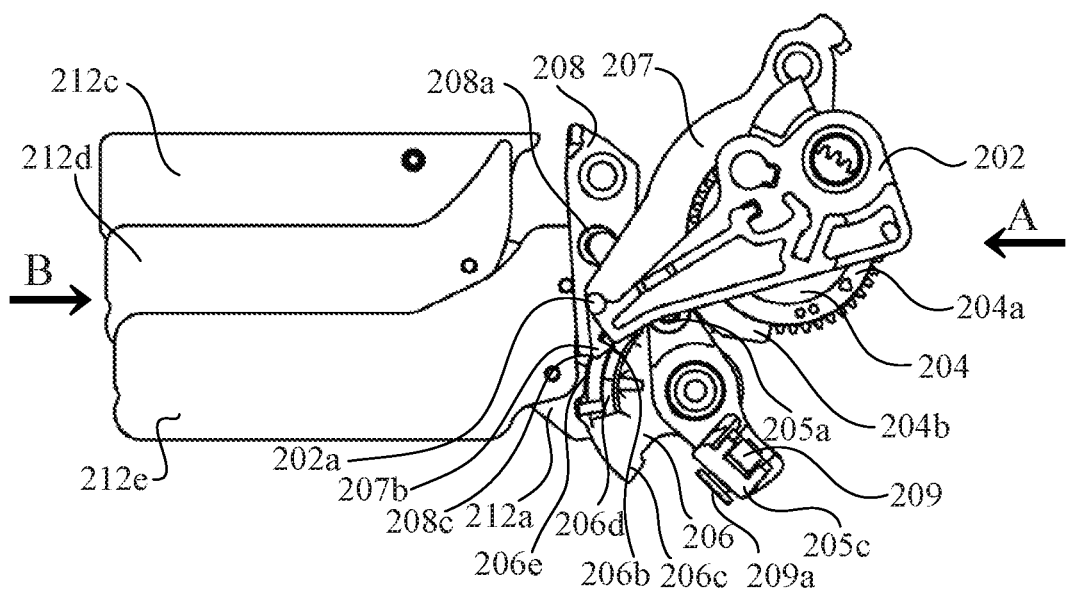
FIGS. 4A to 4C are plane and perspective views that illustrate a principal part in the shutter unit according to this embodiment.
Figure 4B:
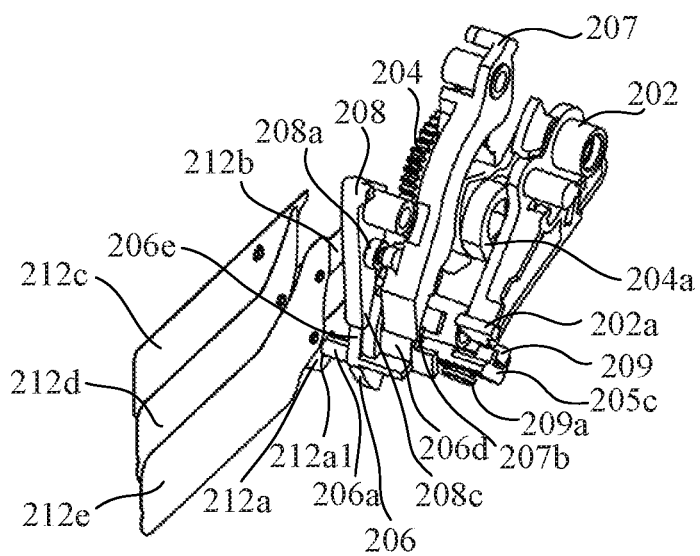
Figure 4C:
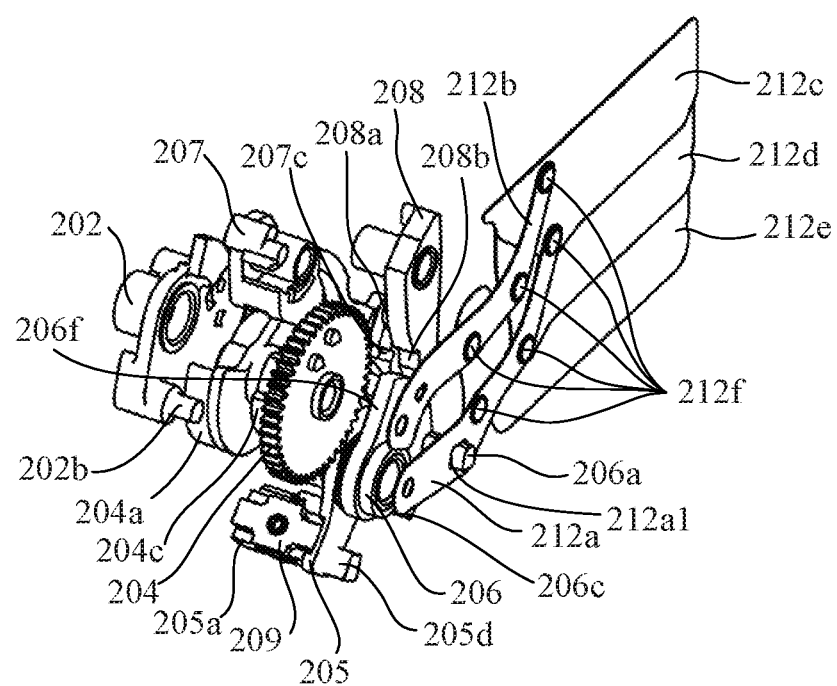
Figures 5A, 5B:
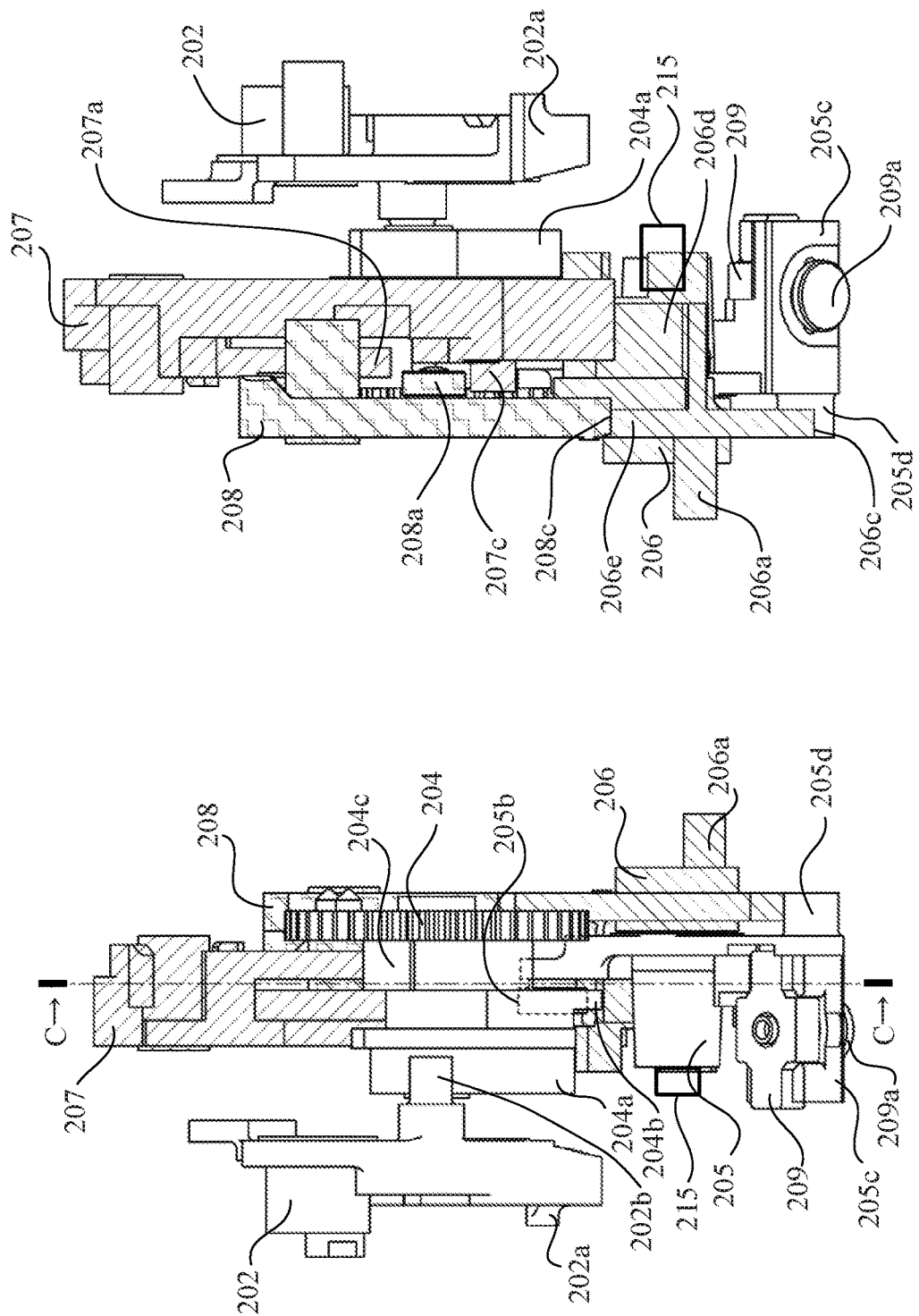
FIGS. 5A and 5B are side views that illustrate the principal part in the shutter unit according to this embodiment.
Figures 6A, 6B:
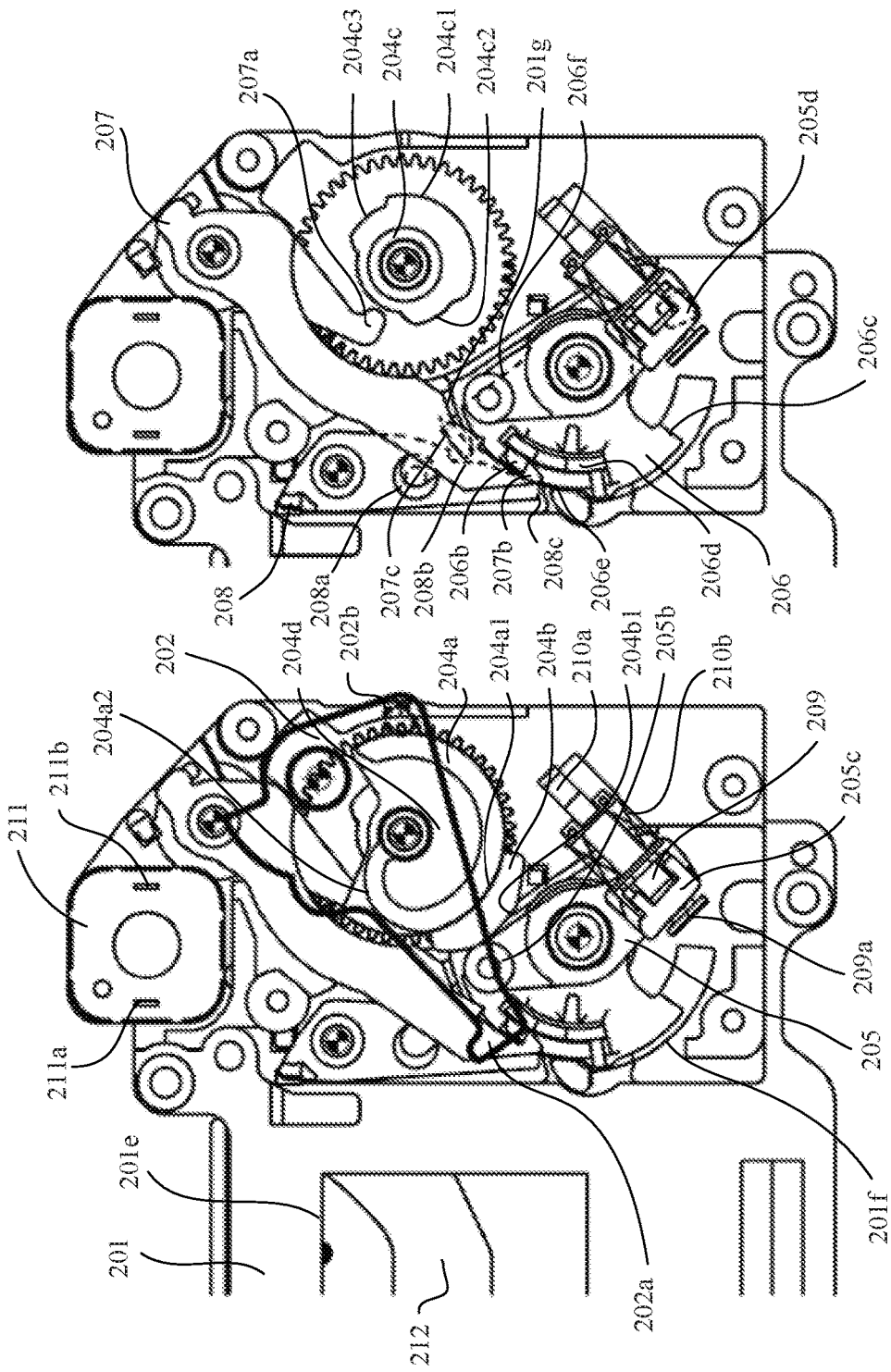
FIGS. 6A and 6B are partially enlarged views of the shutter unit according to this embodiment.

Referring now to FIGS. 4A to 6B, a detailed description will be given of a structure of the shutter unit 20. FIGS. 4A to 4C illustrate only main components in the shutter unit 20. FIG. 4A is its plane view viewed from the object side (the main mirror side in FIG. 3), FIG. 4B is its perspective view viewed from the object side, and FIG. 4C is its perspective view viewed from the user (photographer) side. FIGS. 5A and 5B illustrate only the main components in the shutter unit 20. FIG. 5A is its side view viewed from an A direction in FIG. 4A, and FIG. 5B is its side view viewed from a B direction in FIG. 4A. FIGS. 6A and 6B are partially enlarged view of the shutter unit 20. FIG. 6A is a plane view that illustrates only about right half of the shutter unit 20 viewed from the object side, and only a principal shape for the mirror driving lever 202. FIG. 6B omits the mirror driving lever 202 from FIG. 6A and illustrates a section taken along a line C-C in FIG. 5A for the cam gear 204. Unnecessary components are omitted for better understanding of the figures. FIGS. 4A to 6B illustrate the shutter unit 20 when camera 1 stops.

As illustrated in FIG. 3, a mirror driving spring (second urging member) Sp1 is attached to the mirror driving mirror 202. In FIGS. 6A and 6B, the mirror driving spring Sp1 forces the mirror driving lever 202 in a clockwise direction (so as to move up the main mirror 13). A cam follower 202b contacts a first mirror cam surface 204a1 provided to the mirror cam 204a. The mirror cam 204a performs a charge operation for the mirror driving spring Sp1 on the mirror driving lever 202 via the cam follower 202b.

As illustrated in FIG. 3, a rear curtain driving spring (first urging member) Sp2 is attached to the rear curtain driving lever 205. In FIGS. 6A and 6B, the rear curtain driving spring Sp2 forces the rear curtain driving lever 205 in a clockwise direction (so as to unfold the rear curtain blade unit 212). A roller 205b provided to the rear curtain driving lever 205 contacts the rear curtain cam (drive cam) 204b provided to the cam gear 204. In FIGS. 6A and 6B, the rear curtain driving lever 205 is in an overcharge state. The rear curtain cam 204b performs a charge operation for the rear curtain driving spring Sp2 attached to the rear curtain driving lever 205 via the roller 205b. A force of the rear curtain driving spring Sp2 is stronger than that of a blade lever forcing spring Sp5 in the following sub arm 212b.

The rear curtain driving lever 205 includes an armature support 205c, and the armature support 205c has an (unillustrated) perforation hole. The armature 209 is integrated with the perforation hole, and an armature shaft 209a having a flange member larger than the inner diameter of the perforation hole is engaged with the perforation hole. The armature shaft 209a extends in an approximately orthogonal direction to an absorption surface of the armature 209. An (unillustrated) armature separation spring is disposed between the armature 209 and the armature support 205c. The armature separation spring forces the armature 209 and the armature support 205c in a mutually separating direction.

The drive pin 206a provided to the blade lever 206 perforates through a groove 201f formed in the shutter base plate 201, and is engaged with a hole 212a1 formed in a main arm 212a in the rear curtain blade unit 212. The rear curtain blade unit 212 includes a main arm 212a, a sub arm 212b, a first blade 212c, a second blade 212d, a third blade 212e, and a blade caulking dowel 212f, and forms a parallel linkage. The blade lever forcing spring Sp5 (illustrated in FIG. 3) is attached to the sub arm 212b. The blade lever forcing spring Sp5 forces the sub arm 212b in a direction of folding the rear curtain blade unit 212 (or in a direction closing the rear curtain). Since the drive pin 206a is engaged with the hole 212a1, the blade lever 206 and the main arm 212a integrally operate. The rotating range of the blade lever 206 is restricted by the groove 201f. When the projection 206c provided to the blade lever 206 contact a projection 205d provided to the rear curtain driving lever 205, the blade lever 206 rotates together with the rear curtain driving lever 205 in unfolding the rear curtain blade unit 212.

A fixing lever forcing spring Sp3 (illustrated in FIG. 3) is attached to the fixing lever 207. In FIGS. 6A and 6B, the fixing lever forcing spring Sp3 forces the fixing lever 207 in a counterclockwise direction. In FIGS. 4A to 6B, the cam follower 207a does not contact the fixing am 204c, and the engaging member 207b in the fixing lever 207 contacts a wall (convex) 206d in the blade lever 206. The engaging member 207b locks a locked member 206b provided to the blade lever 206. Thus, the rear curtain blade unit 212 maintains the unfolding state without moving in the folding direction. The wall 206d serves as a light shielding wall for the photo-interrupter 215, as illustrated in FIGS. 5A and 5B. When the wall 206d shields or transmits output light from the photo-interrupter 215, the position of the blade lever 206 can be detected.

A torsion coil spring SP4 (fourth urging member) Sp4 (illustrated in FIG. 3) is attached to the bound lock lever 208. The torsion coil spring Sp4 forces the bound lock lever 208 in the counterclockwise direction in FIGS. 6A and 6B. In addition, in FIGS. 6A and 6B, the bound lock lever 208 contacts an arc portion 206e in the blade lever 206. As the fixing lever 207 swings, the projection 207c in the fixing lever 207 contacts the roller 208a and the bound lock lever 208 swings.

Referring now to FIGS. 6A to 26B, a description will be given of an operation of the shutter unit 20 in actual imaging. In the following description, a finder imaging mode is defined as a mode in which a user confirms and captures the object image on the optical finder 16. A live-view imaging mode is defined as a mode in which a user confirms and captures the object image on the display monitor 26. A forward rotation of the cam gear 204 is a clockwise rotation viewed from the object side, and a reverse rotation of the cam gear 204 is a counterclockwise rotation of the cam gear 204 viewed from the object side. Similarly, a forward rotation direction (first direction) of the motor 211 is a rotational direction when the cam gear 204 forwardly rotates. A reverse rotation direction (second direction) of the motor 211 is a rotational direction when the cam gear 204 reversely rotates.

Figure 7A:
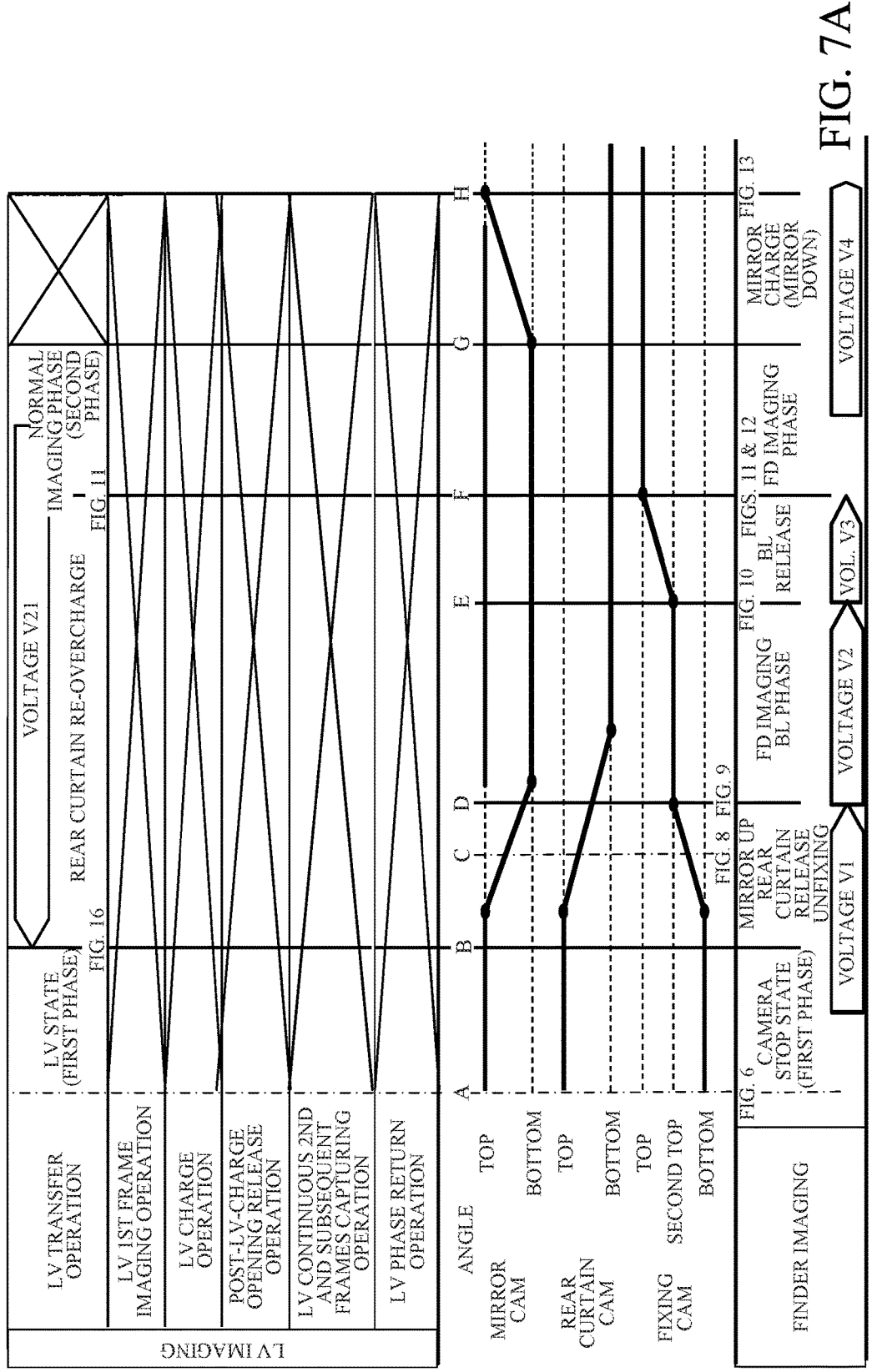
FIGS. 7A and 7B illustrate a cam chart of a cam gear, a control voltage of a motor, and a mechanical operation at each phase according to this embodiment.
Figure 7B:
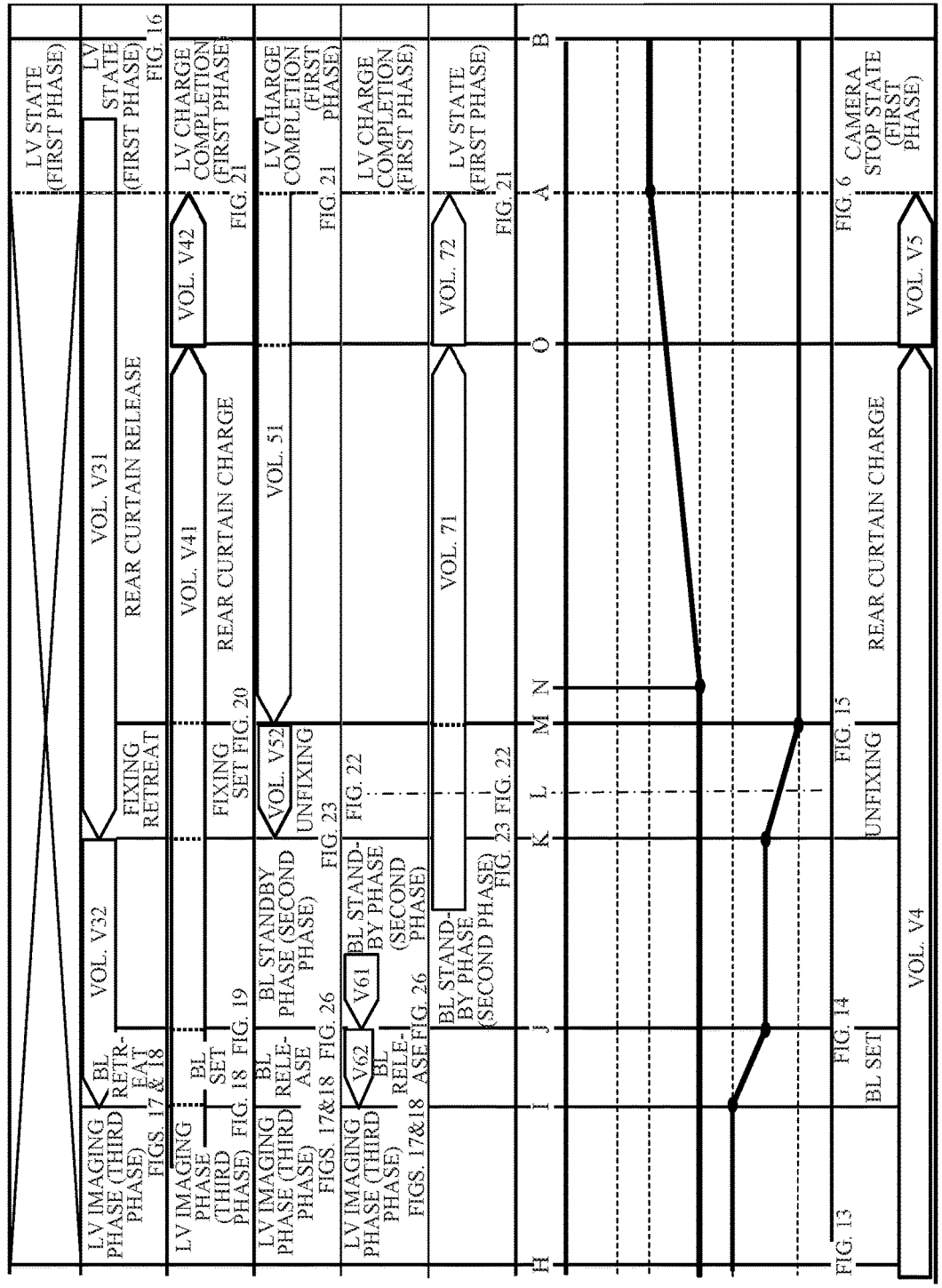

FIGS. 7A and 7B illustrate a cam chart of the cam gear 204, a control voltage for the motor 211, and a mechanical operation with each phase. In addition, FIGS. 7A and 7B illustrate controls in the finder imaging mode and a live-view imaging mode, and the figure numerals (FIGS. 6A, 6B, 8A to 24, 26A, and 26B). In FIGS. 7A AND 7B, the cam gear 204 rotates by 360° as the angle changes to an angle A, an angle B, an angle C, . . . , an angle M, an angle O, and the angle A in this order. In FIGS. 7A AND 7B, FD represents a finder, LV represents a live-view, and BL represents a bound lock. In FIGS. 7A AND 7B, an arrow direction representing the voltage applied to the motor 211 represents a rotating direction of the motor 211.

FIGS. 8A to 24, 26A, and 26B illustrate operating states of the shutter unit 20. In FIGS. 8A to 24, 26A, and 26B, similar to FIGS. 6A and 6B, "A" in each figure illustrates a plane view of only about right half of the shutter unit 20 viewed from the object side, and illustrates only principal shape of the mirror driving lever 202. "B" in each figure omits the mirror driving lever 202 from "A" in each figure, and illustrates a section of only the cam gear 204 taken along a line C-C in FIG. 5A. For better understanding of these figures, unnecessary components are omitted.

Finder Imaging Mode

A description will now be given of an operation of a finder imaging mode. When the camera 1 is in the stop state, the cam gear 204 is in the camera stop state (first phase) illustrated between the angle A and the angle B in FIGS. 7A AND 7B. FIGS. 6A and 6B illustrate the state of the angle A. When the user half-presses the release button 31 in imaging in the finder imaging mode and in the camera stop state, the signal SW1 is generated, and when the signal SW1 is detected, the photometry and the focus detection are performed. Next, when the release button 31 is fully pressed, the signal SW2 is generated. When the signal SW2 is detected, the coil 210b is electrified and armature 209 and the yoke 210a absorb each other and the cam gear 204 is forwardly rotated by applying the voltage to the motor 211 in the forward rotation direction. When the cam gear 204 is forwardly rotated, the angle of the cam gear 204 is changed to the angle B, the angle C, the angle E, and the angle F in this order.

Figures 8A, 8B:
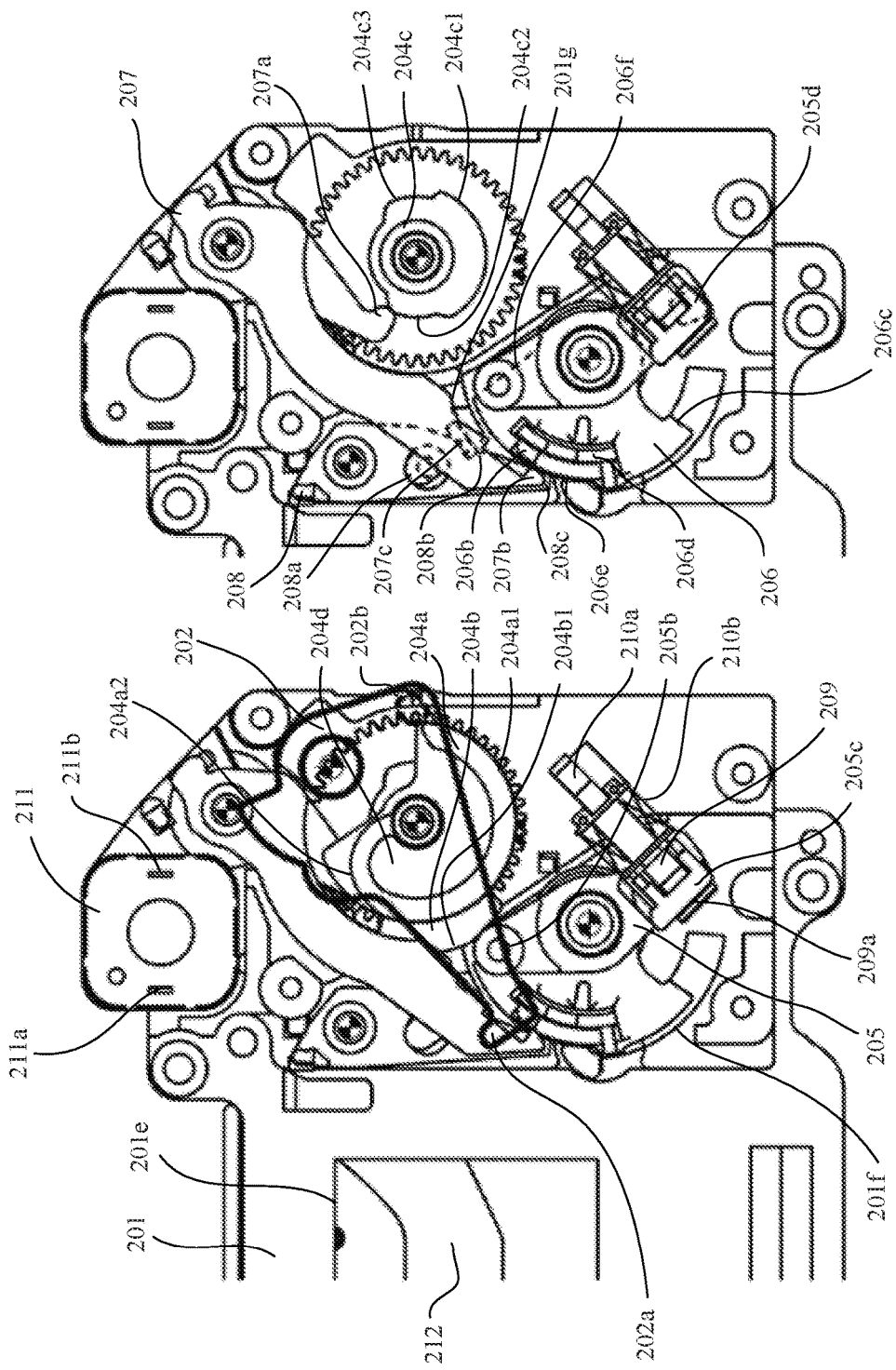
FIGS. 8A and 8B are plane views illustrating an unfixed moment in a finder imaging mode of the shutter unit according to this embodiment.

FIGS. 8A and 8B illustrate the state of the angle C, and the cam gear 204 is forwardly rotated from the state in FIGS. 6A and 6B when the blade lever 206 and the fixing lever 207 are unfixed from each other. When the fixing cam 204c presses the cam follower 207a in FIG. 8B, the fixing lever 207 rotates clockwise and the engaging member 207b is released from the locked member 206b. This state will be referred to as an "unfixed state."

Figures 9A, 9B:
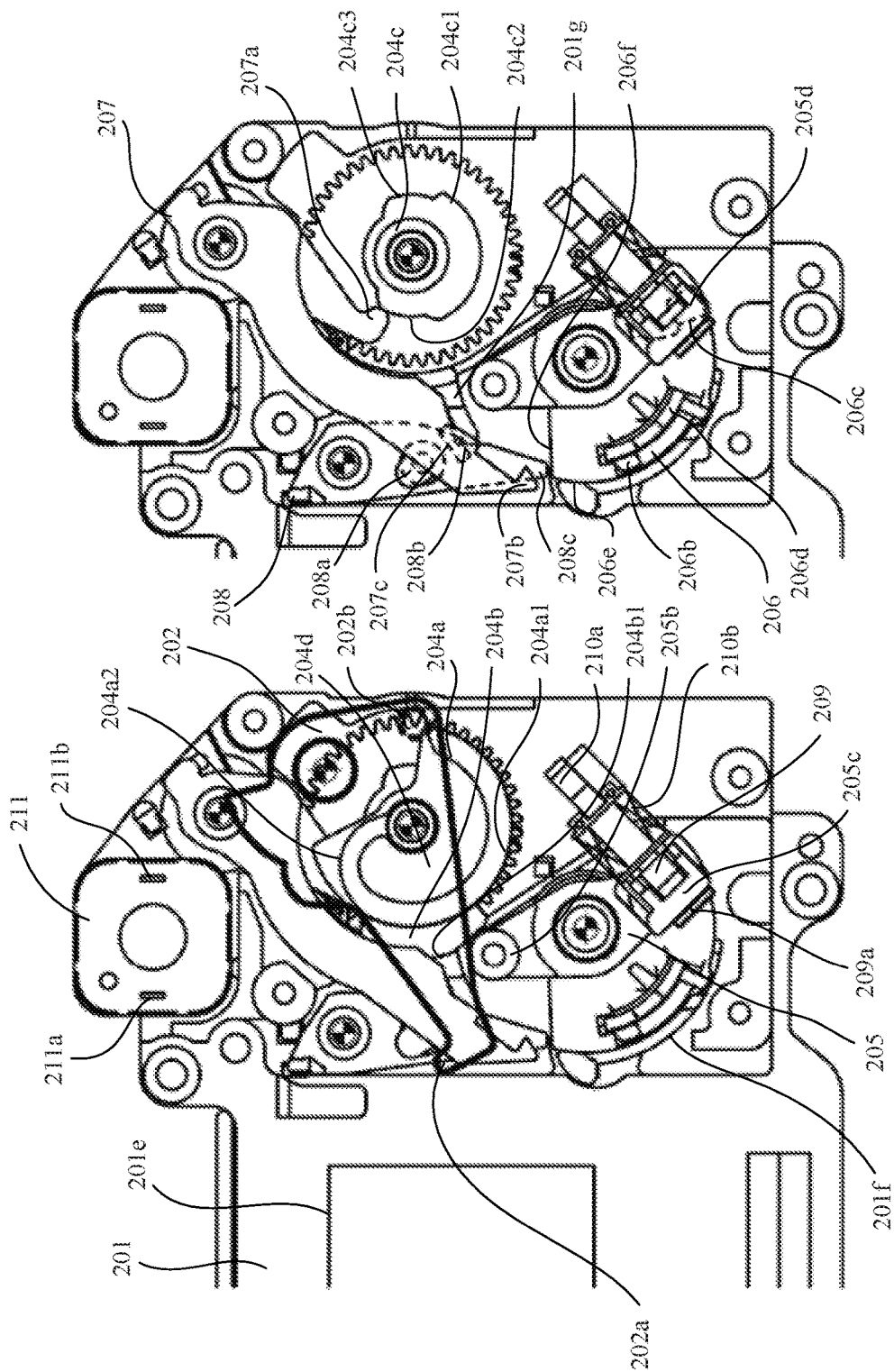
FIGS. 9A and 9B are plane views illustrating that a blade return is completed and a bound lock operation is effective in the finder imaging mode in the shutter unit according to this embodiment.

FIGS. 9A and 9B illustrate the state of the angle D, and the blade lever 206 has counterclockwise rotated from the state in FIGS. 8A and 8B. In FIGS. 8A and 8B, the blade lever 206 rotates counterclockwise when the fixing lever 207 and the blade lever 206 are unlocked from each other. At this time, the rear curtain blade unit 212 is released from the state for covering the opening 201e in the shutter base plate 201. The operation of the blade lever 206 will be referred to as a "blade return operation."

The bound lock lever 208 stops while contacting the arc portion 206e in the blade lever 206 in FIGS. 6A, 6B, 8A, and 8B. When the blade lever 206 rotates counterclockwise in FIGS. 9A and 9B, the bound lock lever 208 also rotates counterclockwise and a stopper portion 208b of the bound lock lever 208 stops while contacting a projection 201g in the shutter base plate 201.

The projection 206c in the blade lever 206 that has provided the blade return operation collides with the projection 205d in the rear curtain driving lever 205, bounces back, or bounds. However, the lock portion 208c in the bound lock lever 208 enters the clockwise moving locus of the blade lever 206 and thus the locked portion 206f in the blade lever 206 contacts the engaging member 208c and a bound amount is restricted. Since the bound amount is restricted, the bound time is restricted. A series of operations will be referred to as a "bound lock operation." A position where the stopper member 208b in the bound lock lever 208 contacts the projection 201g in the shutter base plate 201 is a restricting position for restricting a movement from the open state to the closed state of the blade lever 206. When the bound lock lever 208 enters the moving locus of the blade lever 206 after the lade lever 206 moves from the closed position to the open position, the blade lever 206 is restricted from moving from the open position to the closed position.

The cam follower 207a contacts a second cam surface 204c2 formed on the fixing cam 204c in FIGS. 9A and 9B. In other words, the fixing lever 207 has further rotated counterclockwise from the state in FIGS. 8A and 8B. In FIGS. 9A and 9B, the roller 205b is separated from the cam surface 204b1 on the rear curtain cam 204b and released from the overcharge state.

Figures 10A, 10B:
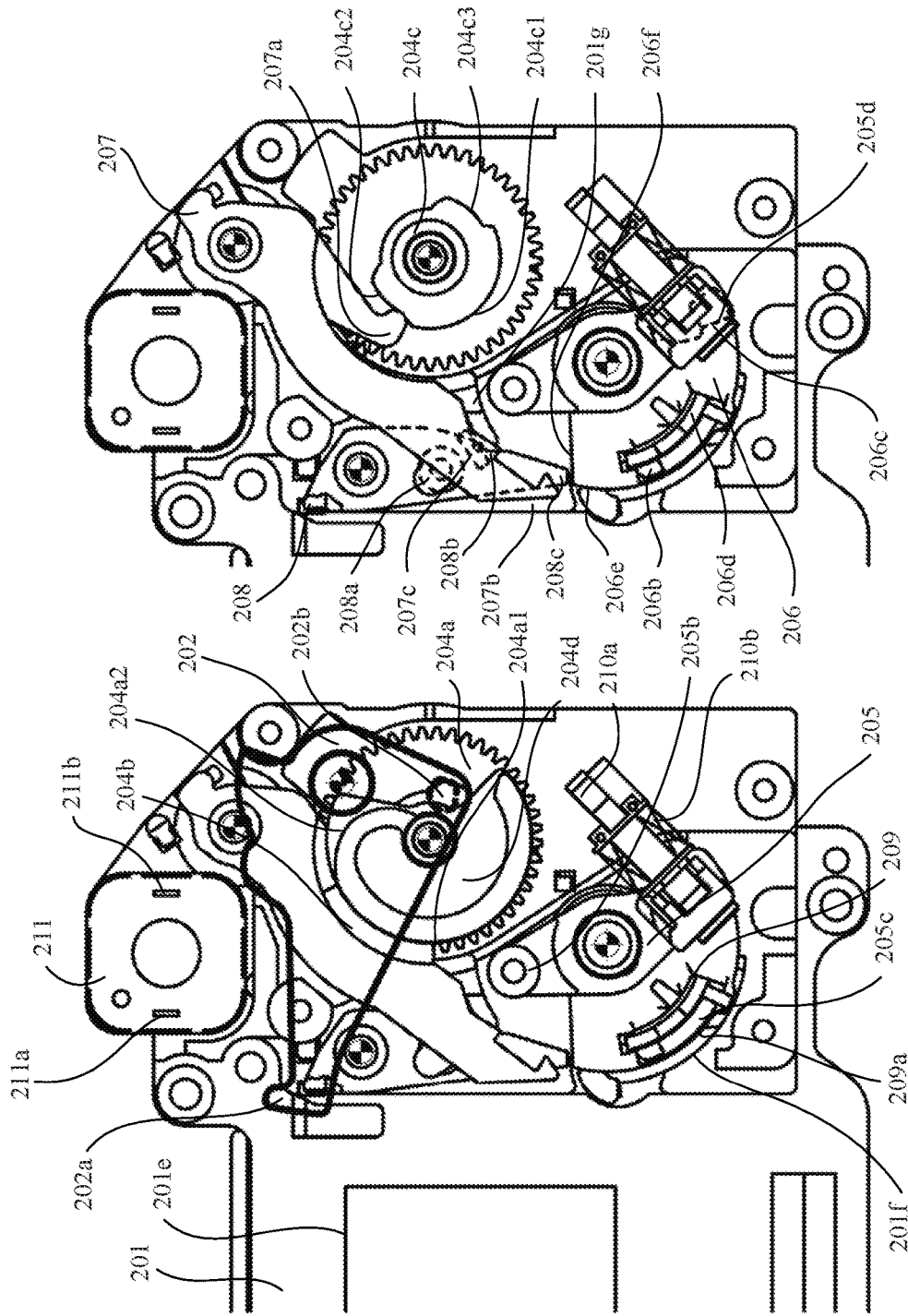
FIGS. 10A and 10B are plane views illustrating that the cam gear is located at a terminal in a bound lock phase after the mirror up operation is completed in the finder imaging mode in the shutter unit according to this embodiment.

FIGS. 10A and 10B illustrate the state of the angle E, and the cam follower 202b in the mirror driving lever 202 comes off from the first mirror cam surface 204a on the mirror cam 204a and has rotated clockwise. At this time, the contact portion 202a in the mirror driving lever 202 contacts the shaft 131b in the main mirror holder frame 131 that is unillustrated in FIGS. 10A and 10B. The main mirror holder frame 131 contacts the mirror box and retreats from the image capturing optical axis (or imaging optical axis or optical axis OA in FIG. 1). A series of operations will be referred to as a "mirror up operation." In addition, in FIGS. 10A and 10B, the cam follower 207a contacts the end of the second cam surface 204c2. In other words, the fixing lever 207 does not move between (the angle D) in FIGS. 9A and 9B and (the angle E) in FIGS. 10A and 10B.

Figures 11A, 11B:
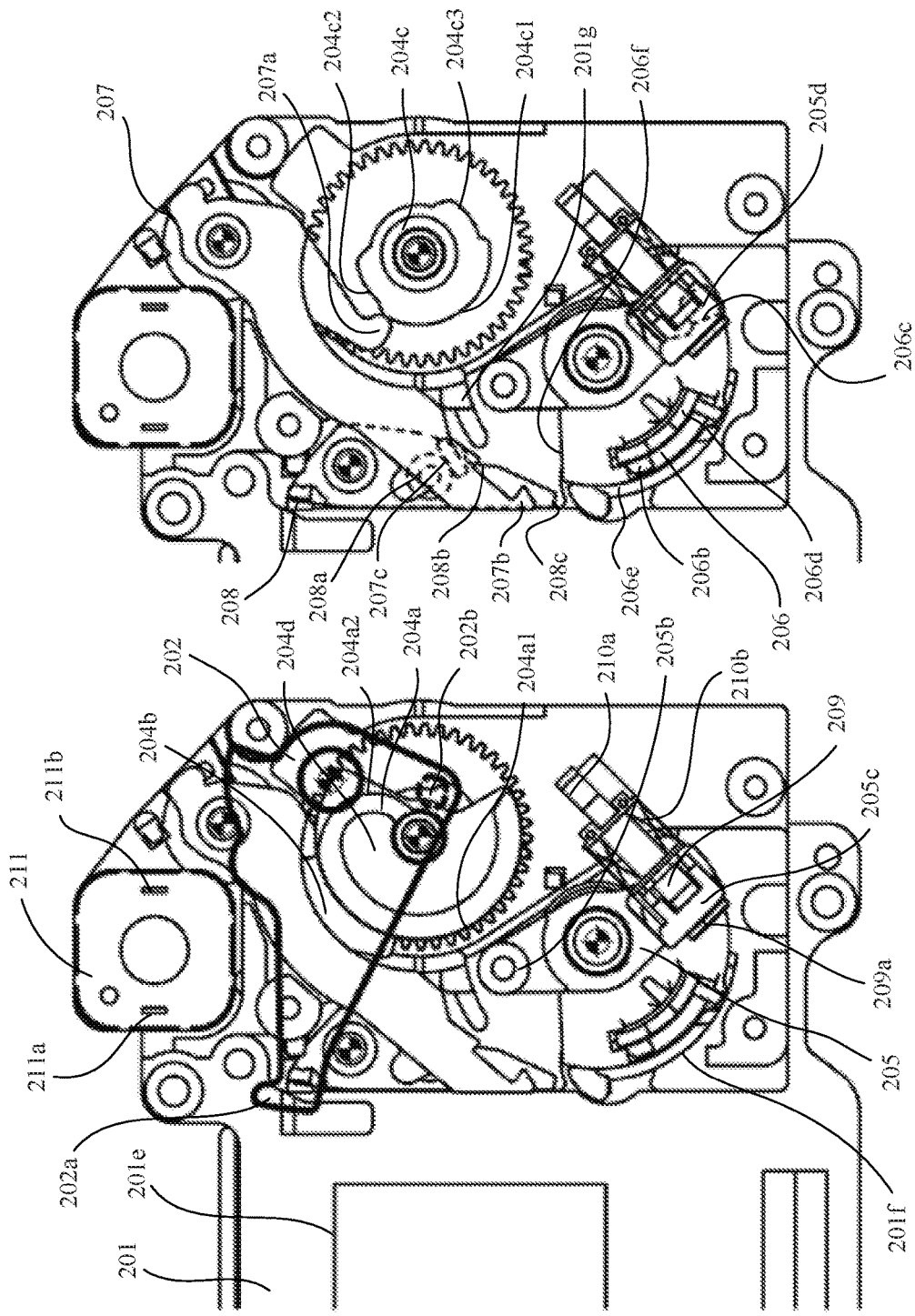
FIGS. 11A and 11B are plane views that illustrate a pre-running standby state in the finder imaging mode of the shutter unit according to this embodiment.
Figures 12A, 12B:
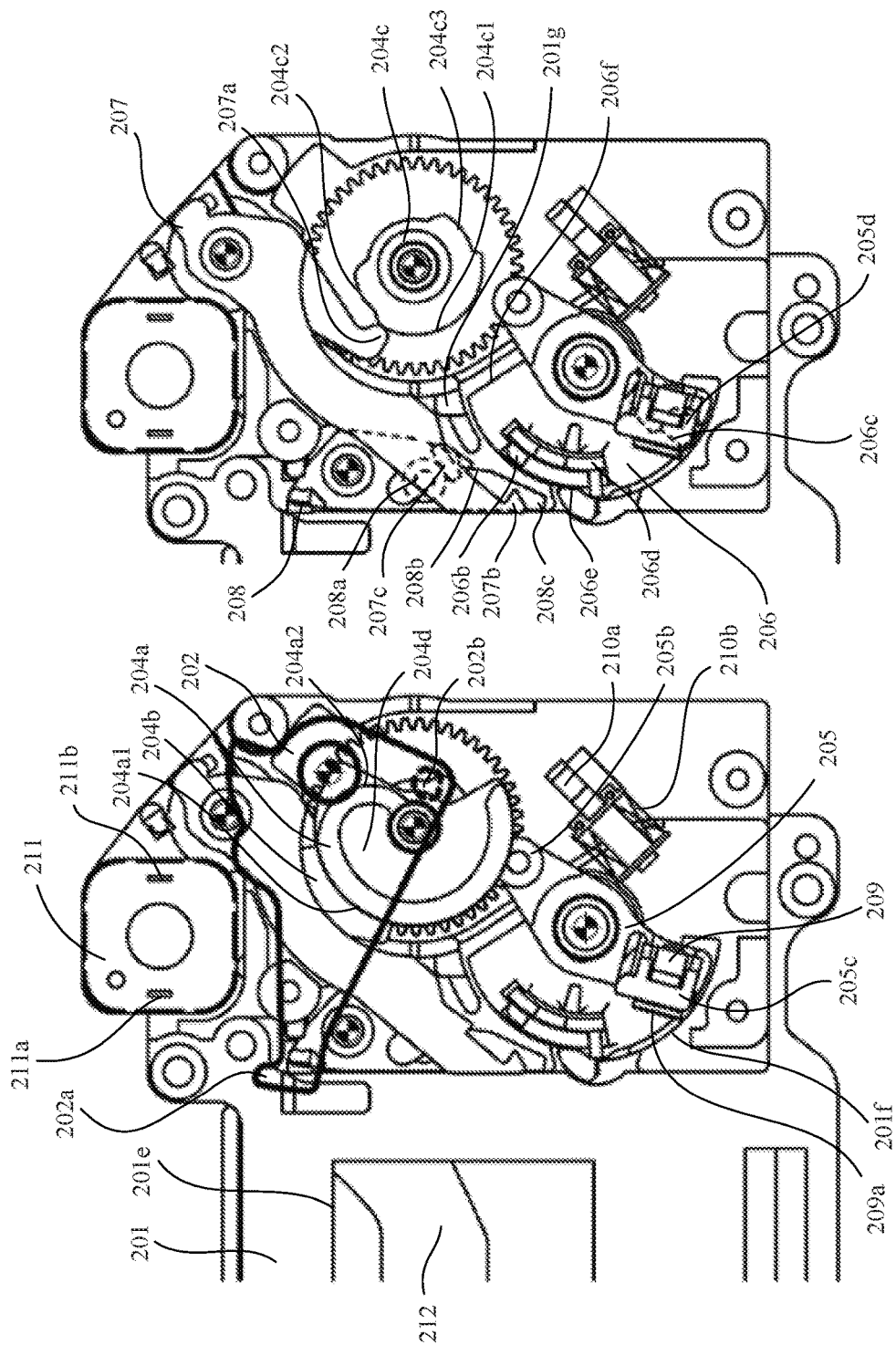
FIGS. 12A and 12B are plane views that illustrate a completion state of the running operation in the finder imaging mode of the shutter unit according to this embodiment.

FIGS. 11A and 11B illustrate the state of the angle F or a pre-running standby state in which the fixing lever 207 and the bound lock lever 208 have rotated from the state in FIGS. 10A and 10B. In the course from the state in FIGS. 10A and 10B to the state in FIGS. 11A and 11B, the fixing lever 207 rotates clockwise since the state in which the cam follower 207a traces the second cam surface 204c2 is changed to the state in which the cam follower 207a traces the first cam surface 204c1. The first cam surface 204c1 is formed with a cam diameter from a rotating center to the outer circumferential surface longer than that of the second cam surface 204c2. The bound lock lever 208 rotates clockwise when the roller 208a is pressed against the projection 207c. At this time, the lock part 208c in the bound lock lever 208 retreats from the moving locus of the blade lever 206. A series of operations will be referred to as a "bound unlock operation." A position where the lock portion 208c in the bound lock lever 208 retreats from the moving locus of the blade lever 206 is a release position. The fixing lever 207 moves the bound lock lever 208 from the restricting position to the release position before the rear curtain driving lever 205 drives the blade lever 206.

An imaging exposure operation starts in the state in FIGS. 11A and 11B, when reset scanning (referred to as "electronic front curtain running" hereinafter) is performed for pixels in the image sensor 23. The armature 209 and the yoke 210a are separated from each other by stopping electrifying the coil 210b a time interval corresponding to the set shutter speed after the electronic front curtain running starts. When the armature 209 is separated from the yoke 210a, the rear curtain driving lever 205 and the blade lever 206 together run clockwise due to the force of the rear curtain driving spring Sp2. In association, the rear curtain blade unit 212 becomes in the state illustrated in FIGS. 12A and 12B for covering the opening 201e in the shutter base plate 201. An operation in which the rear curtain driving lever 205 and the blade lever 206 integrally run will be referred to as a "running operation."

A description will now be given of the voltage applied to the motor 211 in a section from the angle A to the angle F. Initially, in the camera stop state, the voltage (first voltage) V1 is applied so as to forwardly rotate the motor 211. A driving force of the motor 211 is transmitted to the cam gear 204 via the gear train 213, and the cam gear 204 is forwardly rotated. When the cam gear 204 has a state of the angle D, the voltage applied to the motor 211 is turned into a voltage (second voltage) V2. When the cam gear 204 has a state of the angle E, the voltage applied to the motor 211 is turned into a voltage (third voltage) V3. When the cam gear 204 has a state of the angle F, the terminals 211a and 211b of the motor 211 are short-circuited. In other words, the cam gear 204 stops with a finder imaging phase by applying a so-called short brake to the motor 211.

The following relationship is established among the absolute values of the voltages V1 to V3.
|V1|>|V2| and |V3|>|V2|

The voltage V2 is set lower than the voltage V1 so as to securely perform the bound lock operation. In the section for applying the voltage V2 (angle D to angle E or third phase), as illustrated in FIGS. 9A, 9B, 10A, and 10B, the bound lock lever 208 enters the running locus of the blade lever 206. However, there is a time lag from when the blade lever 206 starts the blade return operation with the angle C and then bounds to when the locked member 206f contacts the engaging member 208c. When the voltage V2 is maintained high and the blade lever 206 bounds, the bound lock lever 208 may retreat. In other words, before the bound lock operation is completed, the bound unlock operation is performed and a bound time period consequently becomes longer.

For the secure bound lock operation, the finder imaging bound lock phase illustrated by the angle D to the angle E may be set longer but when it is set excessively long, each phase cannot be efficiently assigned to a finite angle of 360° for one cam rotation of the cam gear 204. In other words, the angle of 360° can be maximized by setting the voltage V2 to be low and a larger angle can be assigned for a work that needs a large angle as in charging.

After the bound lock operation is performed with the finder imaging bound lock phase, a bound unlock operation is performed as soon as possible by driving the motor 211 with the voltage V3 higher than the voltage V2. As a result, the release time lag can be shortened or the frame rate can be accelerated.

Figures 13A, 13B:
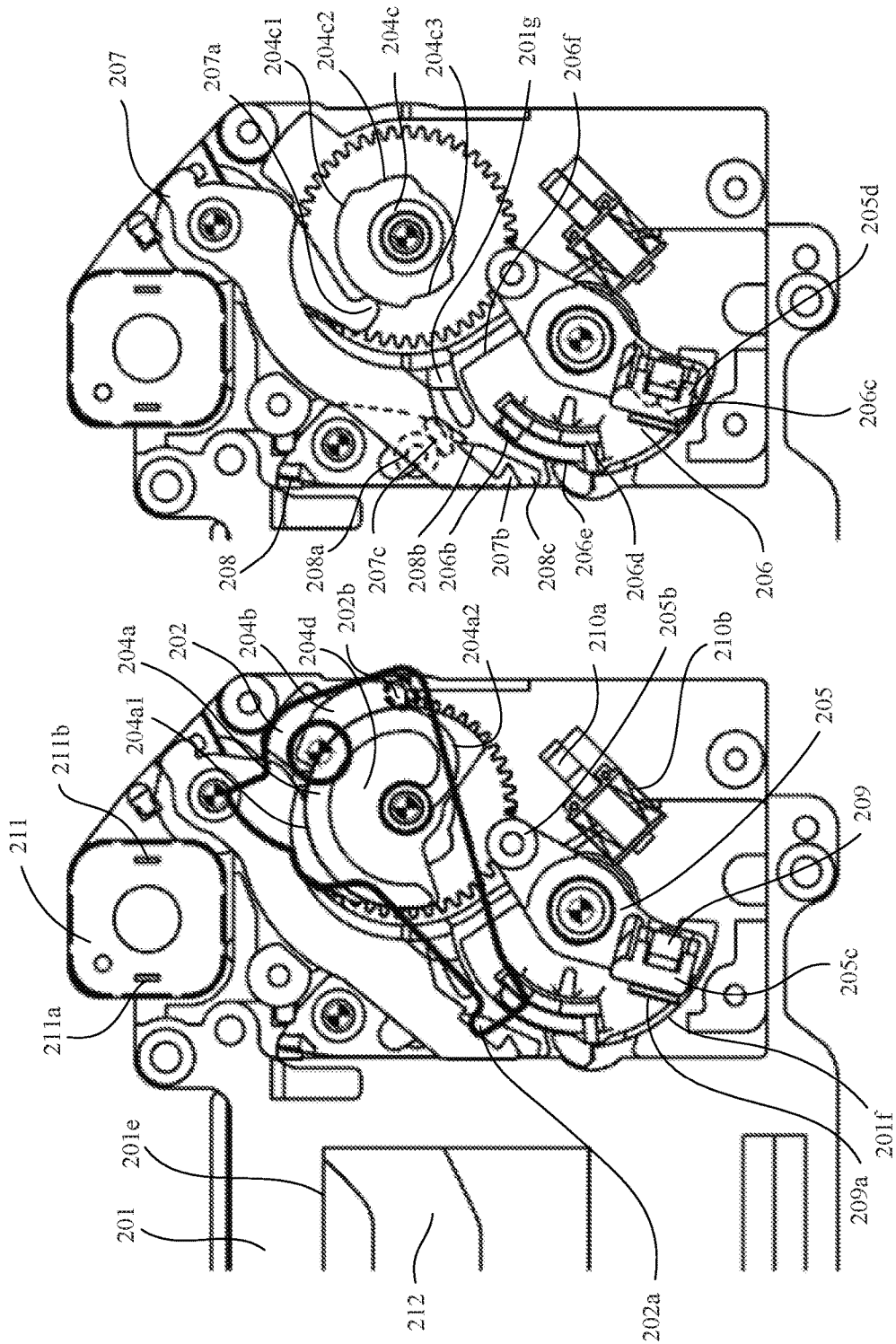
FIGS. 13A and 13B are plane views that illustrate a completion state of a mirror charge operation in the finder imaging mode of the shutter unit according to this embodiment.

The voltage is again applied to the motor 211 in the forward rotation direction and the cam gear 204 starts forwardly rotating after the running operation. In a section from the angle C to the angle H, the cam follower 202b is pressed against the second mirror cam surface 204a2 and the mirror driving lever 202 is rotated counterclockwise. FIGS. 13A and 13B illustrate the state of the angle H in which the cam follower 202b contacts the first mirror cam surface 204a1. In FIGS. 13A and 13E, charging for the mirror driving spring Sp1 is completed. The main mirror holder frame 131 is in the mirror down state in which it moves down in association with the mirror driving lever 202 and enters the imaging optical axis (optical axis OA in FIG. 1). A series of operations will be referred to as a "mirror charge operation."

Figures 14A, 14B:
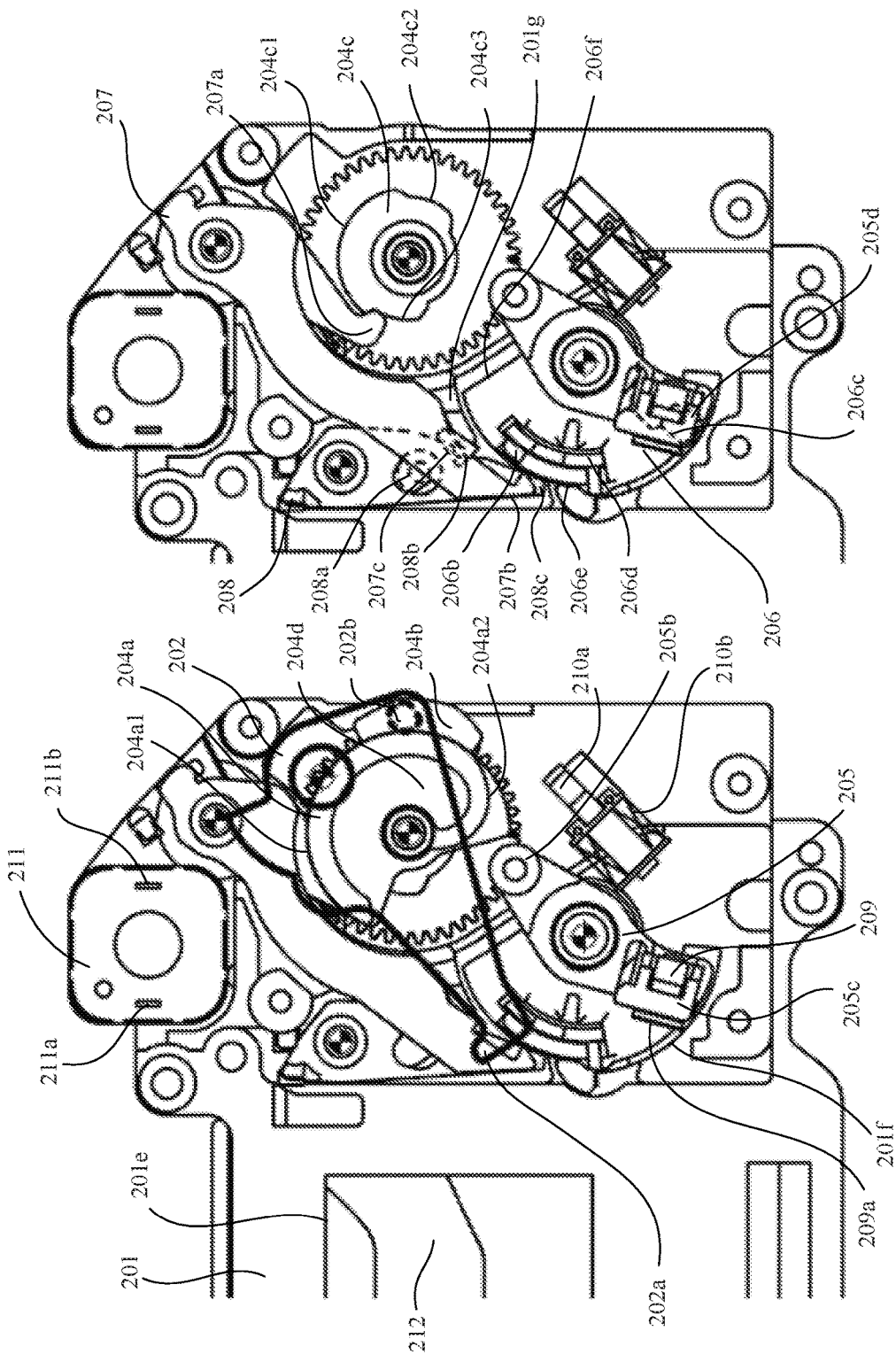
FIGS. 14A and 14B are plane views that illustrate a completion state of a bound lock set operation in the finder imaging mode of the shutter unit according to this embodiment.

In a section from the angle I to the angle J, the cam follower 207a turns from the state for tracing the first cam surface 204c1 to the state for tracing the second cam surface 204c3, and the fixing lever 207 rotates counterclockwise. FIGS. 14A and 14B illustrate the state of the angle J. As the fixing lever 207 rotates counterclockwise, the bound lock lever 208 rotates counterclockwise and contacts the arc portion 206e of the blade lever 206. At this time, the roller 208a is separated from the projection 207c. A series operations will be referred to as a "bound lock set operation."

Figures 15A, 15B:
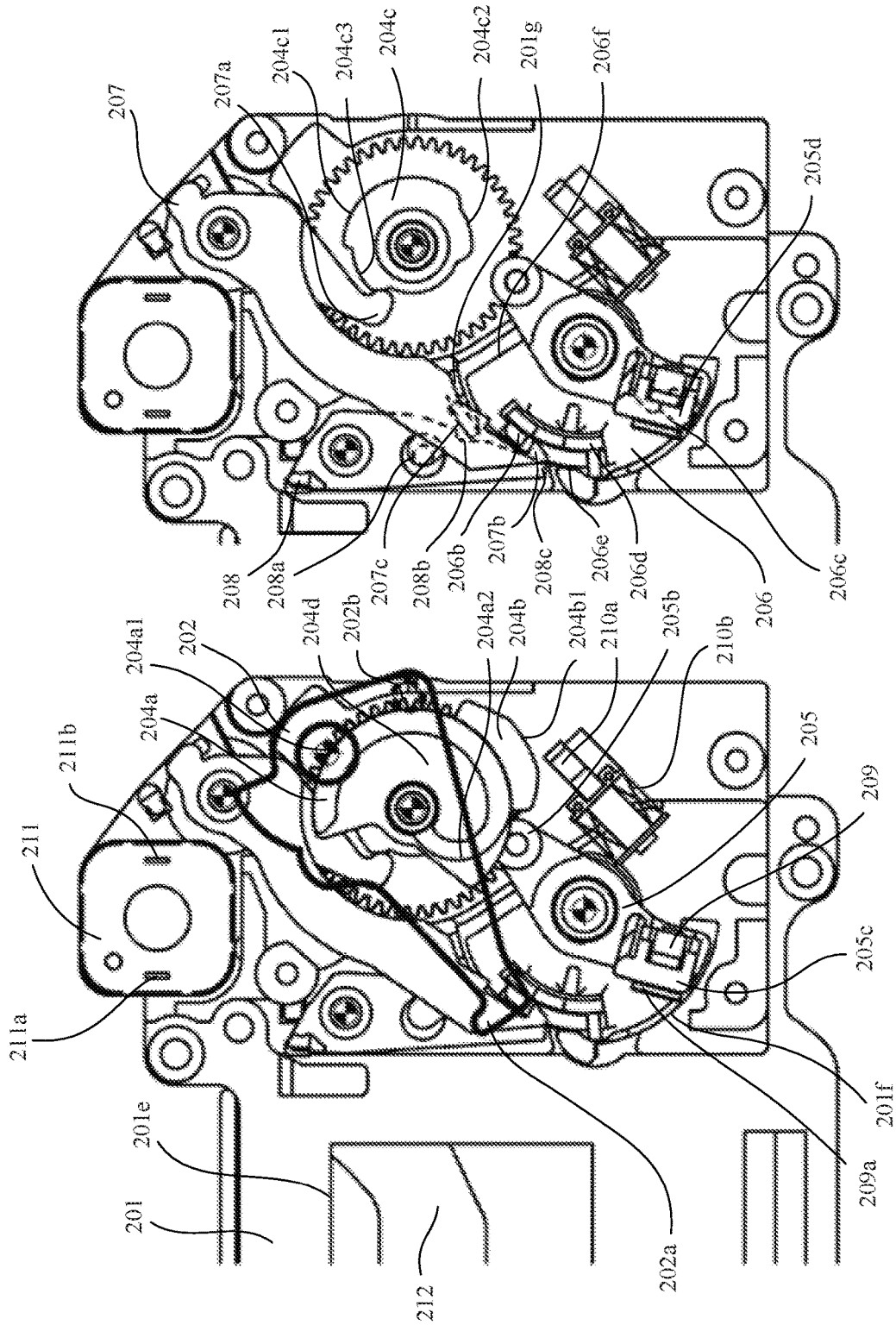
FIGS. 15A and 15B are plane views that illustrate a completion state of a fixing set operation in the finder imaging mode of the shutter unit according to this embodiment.

The cam follower 207a comes off from the second cam surface 204c3 in a section from the angle K to the angle M, and the fixing lever 207 rotates counterclockwise. FIGS. 15A and 15B illustrate the state of the angle M, in which the fixing lever 207 contacts the wall 206d in the blade lever 206. An operation of the fixing lever 207 will be referred to as a "fastening set operation."

In a section from the angle N to the angle A, a rear curtain cam 204b in the cam gear 204 presses the roller 205b, charges the rear curtain driving spring Sp2 and returns to the initial state illustrated in FIGS. 6A and 6B. This operation will be referred to as a "rear curtain charge operation." At this time, the blade return operation of the blade lever 206 is restricted since the engaging member 207b locks the locked member 206b. The rear curtain blade unit 212 maintains the state for covering the opening 201e in the shutter base plate 201.

A description will now be given of the voltage applied to the motor 211 in the section from the angle F to the angle A. When driving starts, the voltage V4 is applied so as to forwardly rotate the motor 211. The driving force of the motor 211 is transmitted to the cam gear 204 via the gear train 213, and the cam gear 204 is forwardly rotated. When the cam gear 204 has a state of the angle O, the voltage applied to the motor 211 is switched to the voltage V5. When the cam gear 204 has the state of the angle A, the cam gear 204 stops with a phase in the camera stop state by applying the short brake to the motor 211.

The following relationship is established between the absolute value of the voltage V4 and the absolute value of the voltage V5.

$|V4|>|V5|$

Due to this voltage control, an overrun of the cam gear 204 when the motor 211 stops, is smaller than that when the same voltage is applied to the motor 211. In other words, a phase range in the camera stop state can be set narrow, a free run time in the mirror up becomes shorter, and a frame rate can be accelerated.

Live-View Imaging Mode

Next follows a description of an operation of a live-view imaging mode. The operation of the live-view imaging mode is divided into the following six operations, or a live-view transfer operation, a live-view first-frame imaging operation, a live-view charge operation (charge operation), a post-live-view-charge opening release operation (release operation), a live-view continuous second and subsequent frames capturing operation, and a live-view phase return operation (phase return operation).

The live-view transfer operation is an operation for performing the blade return operation and the mirror up operation from the state in which the camera 1 stops, until the live-view state is set in which the object image can be confirmed on the display monitor 26. The live-view first-frame imaging operation is an operation from when the live-view state starts to when the electronic front curtain running and the running operation are completed. The live-view charge operation is an operation that starts from when the live-view first-frame imaging operation or the live-view continuous second and subsequent frames capturing operation is completed to when charging of the rear curtain driving spring Sp2 is completed. The post-live-view-charge opening release operation is an operation from when the live-view charge operation is completed to when the blade return operation is completed. The live-view continuous second and subsequent frames capturing operation is an operation from when the post-live-view-charge opening release operation is completed to when the electronic front curtain running and the running operation are completed. The live-view phase return operation is an operation from when the post-live-view-charge opening release operation is completed to when the same state as the live-view transfer operation completion is returned.

Live-View Transfer Operation

The cam gear 204 is forwardly rotated when the coil 210b is electrified, the armature 209 and the yoke 210a absorb each other in the camera stop state, and the voltage is applied to the motor 211 in the forward rotation direction. When the cam gear 204 is forwardly rotated, the angle of the cam gear 204 moves to the angle B, the angle C, the angle D, the angle F, and the angle F in this order. During this period, the blade return operation and the mirror up operation are performed. In other words, the state in FIGS. 6A and 6B is transferred to the state in FIGS. 11A and 11B. A control method at this time is the same as that in the finder imaging mode (normal mode) and a detailed description thereof will be omitted. FIGS. 7A AND 7B omits the operation from the angle B to the angle F in the live-view transfer operation. In the finder imaging mode (normal mode), the electronic front curtain running and the running operation are performed from the state in FIGS. 11A and 11B so as to move to the state in FIGS. 12A and 12B, but in the live-view transfer operation, the cam gear 204 reversely rotates from the state in FIGS. 11A and 11B and moves to the angles F, F, D, and B in this order.

Figures 16A, 16B:
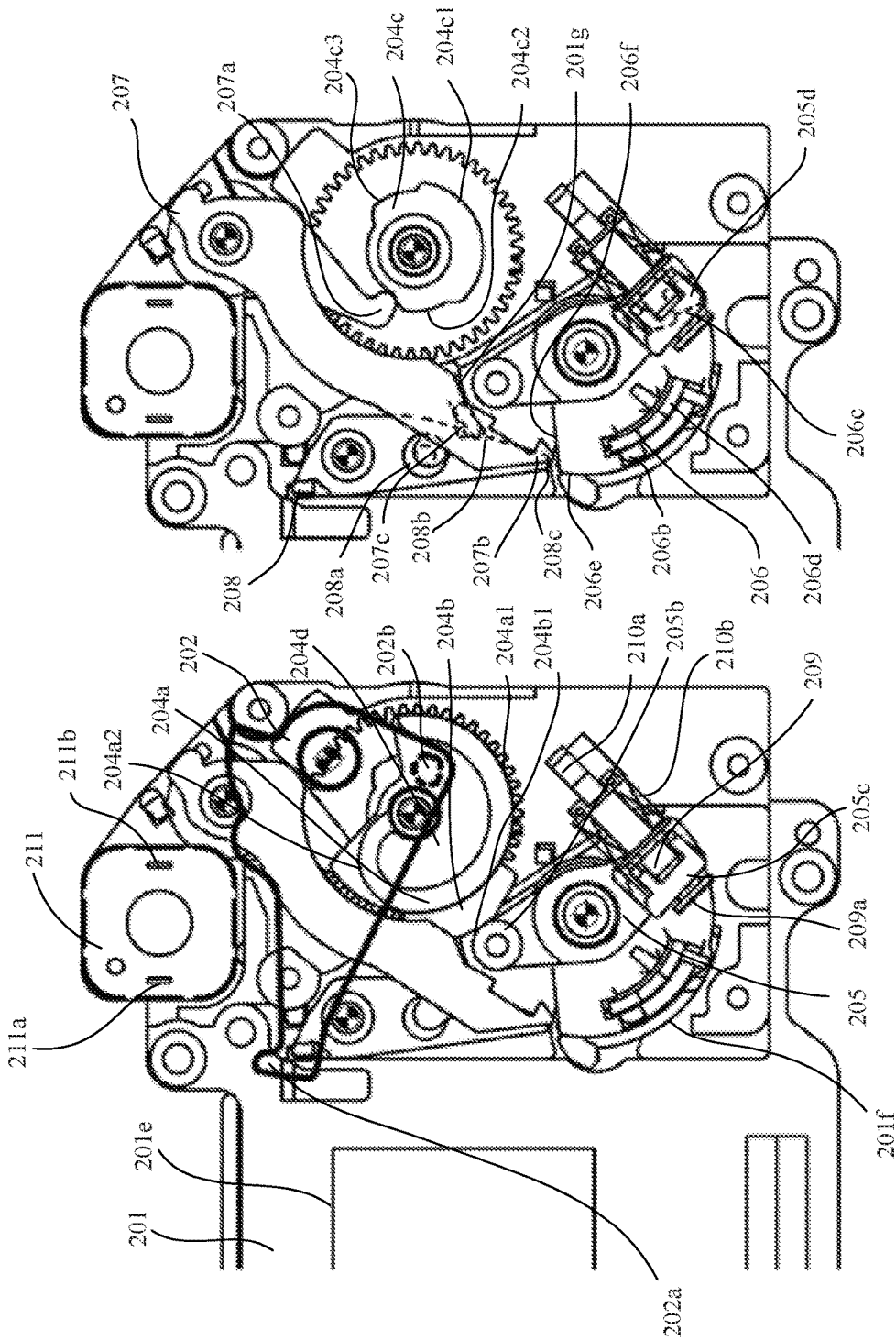
FIGS. 16A and 16B are plane views that illustrate the live-view state of the shutter unit according to this embodiment.

FIGS. 16A and 16B illustrate the state of the angle B, in which the cam follower 202b is inserted into the concave 204d formed inside of the mirror cam 204a. Due to the concave 204d, the cam gear 204 can be reversely rotated while the mirror up state is maintained. Since the blade return operation has been completed, the opening 201e in the shutter base plate 201 is opened. Thus, the object light can be guided to the image sensor 23 for the live-view.

After the state is transferred to the one in FIGS. 16A and 16B, the live-view state is obtained by cutting the electrification to the coil 210b and by displaying the object image captured by the image sensor 23 on the display monitor 26. Since the roller 205b is located on the cam surface 204b1 of the rear curtain cam 204b, even when the electrification to the coil 210b is cut, the rear curtain driving lever 205 does not run. Hence, it is unnecessary to electrify the coil 210b in the live-view, and this configuration contributes the power saving in the live-view. It is understood from the above description that the live-view state and the camera stop state have a different opening/closing state of the rear curtain blade unit 212 and a different up/down state of the mirror driving lever 202 although the cam gear 204 has the same phase.

A description will now be given of the voltage applied to the motor 211 in a section from the angle F to the angle B. In the live-view transfer operation, the voltage V21 is applied so as to reversely rotate the motor 211 from the state in FIGS. 11A and 11B. When the cam gear 204 has the state of the angle B, the short brake is applied to the motor 211.

The following relationship is established between the absolute value of the voltage V21 and the absolute value of the voltage V4.

$|V21|<|V4|$

A voltage as high as possible is set to the voltage V4 so as to make the frame rate as high as possible. However, since a mirror charge and a rear curtain charge are performed in the period for applying the voltage V4, the cam gear 204 has a low rotating speed. An overrun of the cam gear 204 is restrained because the short brake is applied after the voltage is switched to the voltage V5 more effectively than that when the short brake is applied with the voltage V4. A first phase as a phase of the cam gear 204 between the angle A and the angle B is set optimal to this restrained overrun. Therefore, when the voltage V21 is the voltage V4 or higher, the cam gear 204 significantly overruns and cannot stop with the first phase. As the first phase is made larger an overrun problem does not occur. However, the cam gear 204 has a long free running distance in the normal mode when the imaging starts, and a release time lag becomes longer. In order to avoid this problem, the voltage V21 is set lower than the voltage V4.

Live-View First-Frame Imaging Operation

When the user half-presses the release button 31 in the live-view state (the state in FIGS. 16A and 16B), the signal SW1 is generated, and when the signal SW1 is detected, the photometry and the focus detection are performed with the image sensor 23. Next, when the user fully presses the release button 31, the signal SW2 is generated. When the signal SW2 is detected and the coil 210b is electrified, the armature 209 and the yoke 210a absorb each other. When the cam gear 204 is reversely rotated, the angle of the cam gear 204 moves to the angle A, the angle O, the angle N, the angle K, the angle J, and the angle I in this order.

The overcharge state of the rear curtain driving lever 205 is released in the section from the angle A to the angle N. In the section from the angle M to the angle K, the cam follower 207a is located on the second cam surface 204c3 and the fixing lever 207 retreats from the running locus of the blade lever 206. In the section from the angle J to the angle I, the cam follower 207a is located on the first cam surface 204c1, the projection 207c presses the roller 208a, and the bound lock lever 208 retreats from the running locus of the blade lever 206. This configuration provides the pre-running standby state in the live-view mode illustrated in FIGS. 17A and 17B.

Figures 17A, 17B:
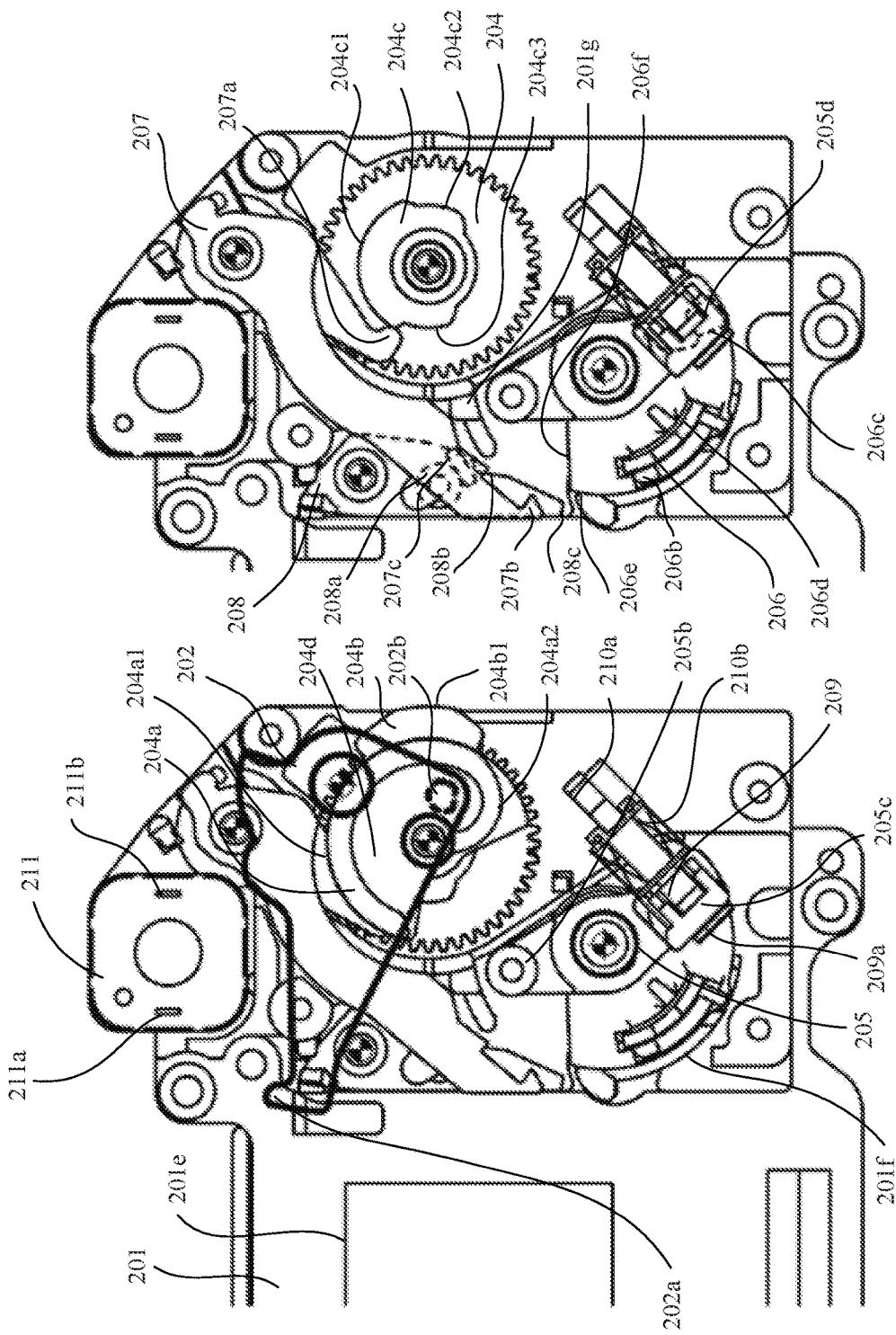
FIGS. 17A and 17B are plane views that illustrate a pre-running standby state in a live-view imaging mode of the shutter unit according to this embodiment.

In FIGS. 17A and 17B, similar to the live-view transfer operation, the cam follower 202b is inserted into the concave 204d. Due to the concave 204d, the cam gear 204 can be reversely rotated further than the live-view state. In the state of FIGS. 17A and 17B, the electronic front curtain running and the running operation are performed, and the running completion state is obtained in the live-view mode illustrated in FIGS. 18A and 18B.

A description will now be given of the voltage applied to the motor 211 in the section from the angle A to the angle I. Initially, the voltage V31 is applied so as to reversely rotate the motor 211. The driving force of the motor 211 is transferred to the cam gear 204 via the gear train 213, and the cam gear 204 is reversely rotated. When the cam gear 204 has the angle K, the voltage applied to the motor 211 is switched to the voltage V32. When the cam gear 204 has a state of the angle I, the short brake is applied to the motor 211 and the cam gear 204 stops with the live-view imaging phase (third phase).

The following relationship is established between the absolute value of the voltage V31 and the absolute value of the voltage V32.

|V31|>|V32|

Due to this voltage control, an overrun of the cam gear 204 when the motor 211 stops, is smaller than that when the same voltage is applied to the motor 211. In other words, a live-view imaging phase range can be set small and the design freedoms of the second mirror cam surface 204a2 and the concave 204d increase. As understood from FIGS. 17A and 17B, the second mirror cam surface 204a2 and the concave 204d have a relationship of two sides of the same coin. When the overrun of the cam gear 204 is large, the concave 204d needs a larger range and a range of the second mirror cam surface 204a2 must be narrow so that the concave 204d does not perforate the second mirror cam surface 204a. As the range of the second mirror cam surface 204a2 becomes narrow, a load applied to the cam gear 204 increases in the mirror charge. When the overrun is small, the above problem can be made as small as possible. In addition, when the overrun is small, the free time period becomes short in the live-view charge operation and the frame rate can be accelerated.

Live-View Charge Operation

Figures 18A, 18B:
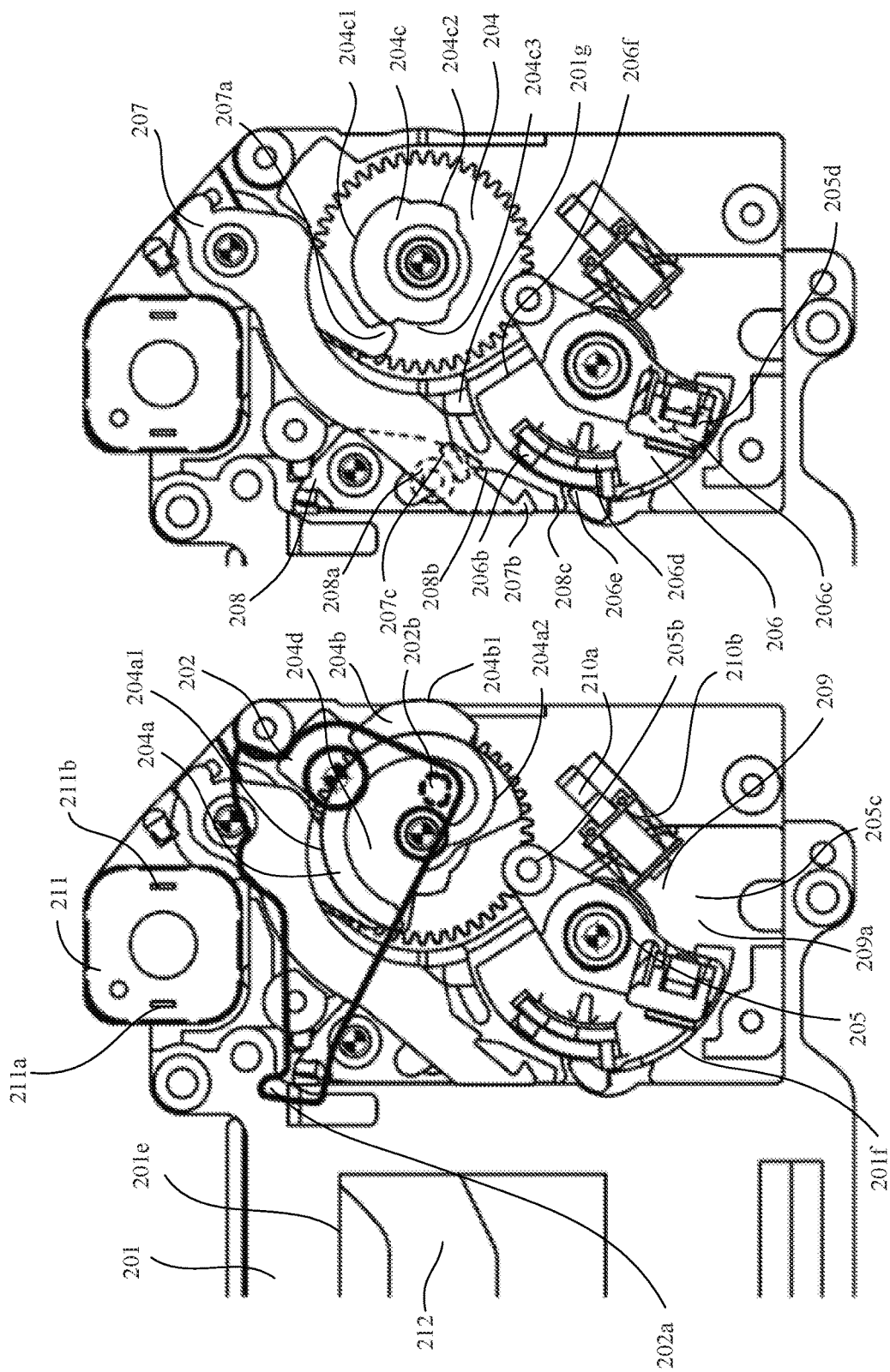
FIGS. 18A and 18B are plane views that illustrate a completion state of the running operation in the live-view imaging mode of the shutter unit according to this embodiment.
Figures 19A, 19B:
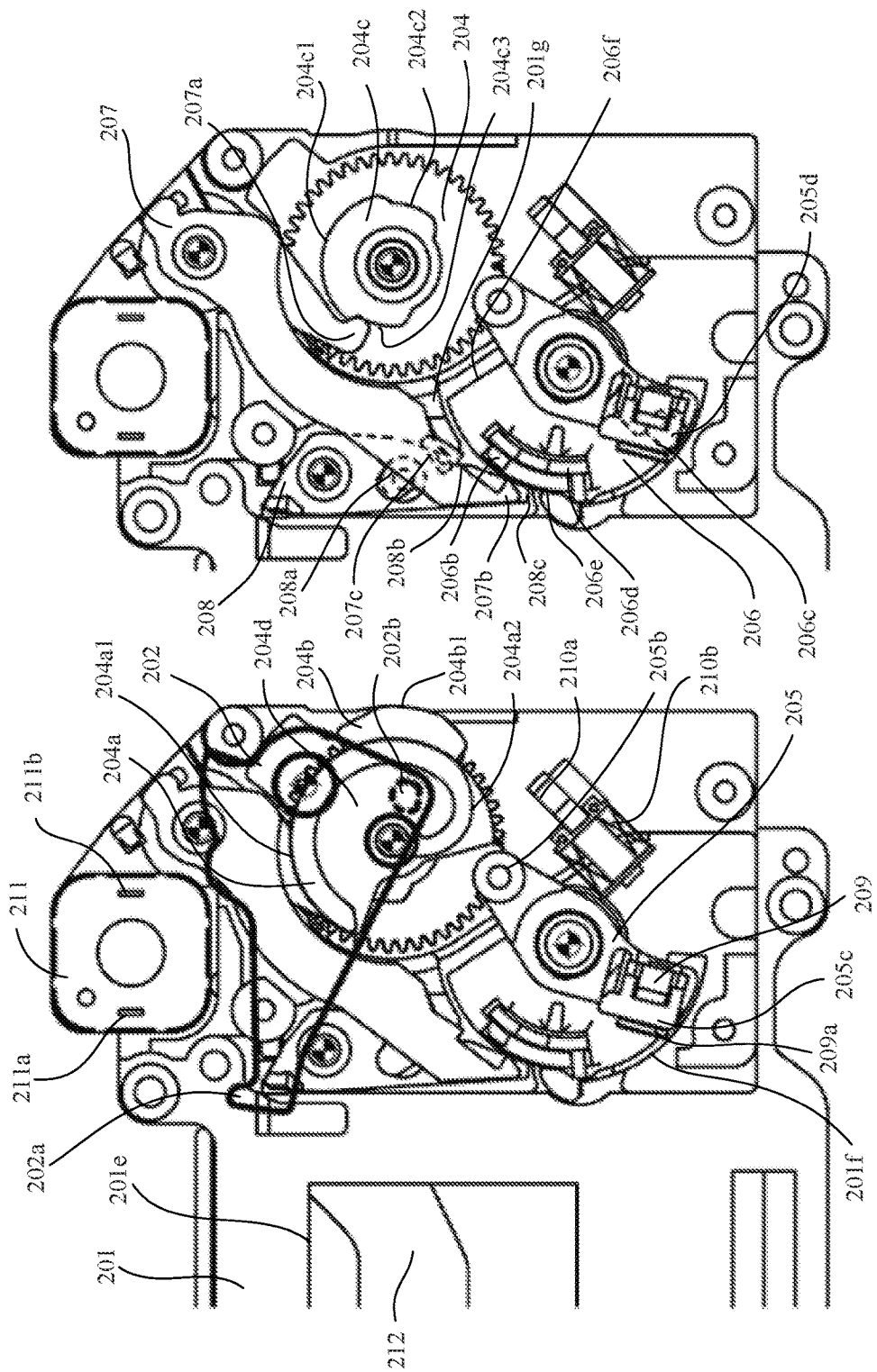
FIGS. 19A and 19B are plane views that illustrate a completion state of the bound lock set operation in the live-view imaging mode of the shutter unit according to this embodiment.
Figures 20A, 20B:
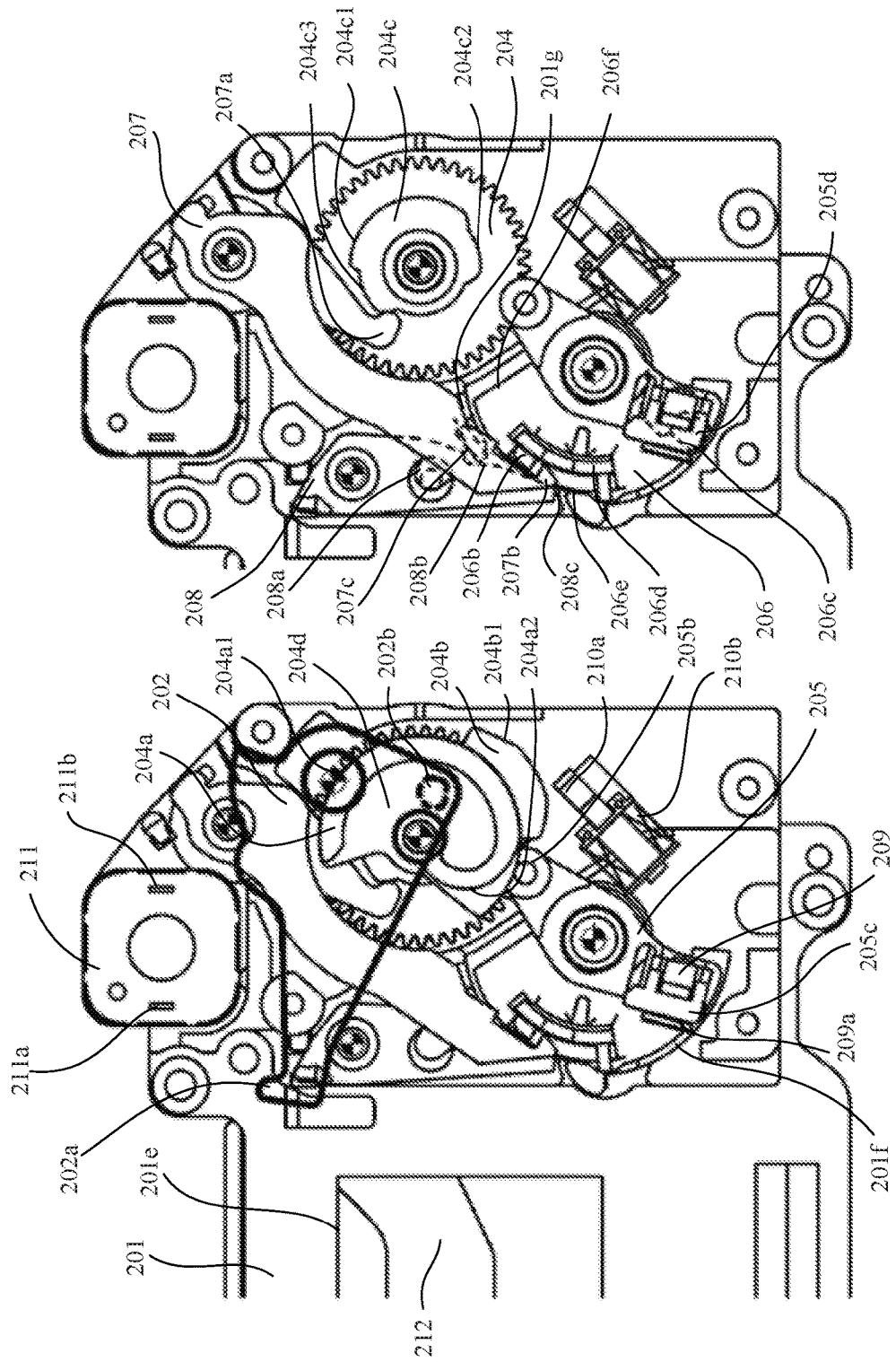
FIGS. 20A and 20B are plane views that illustrate a completion state of the fixing set operation in the live-view imaging mode of the shutter unit according to this embodiment.

The live-view charge operation is performed when the cam gear 204 is forwardly rotated from the state in FIGS. 18A and 18B and the cam gear 204 moves to the angles I, the angle J, the angle K, . . . , the angle N, the angle O, and the angle A in this order. The bound lock set operation is performed from the angle I to the angle J, and the bound lock set operation completion state is obtained in the live-view imaging mode illustrated in FIGS. 19A and 19B. The fixing set operation is performed from the angle K to the angle M, and the fixing set operation completion state is obtained in the live-view imaging mode illustrated in FIGS. 20A and 20B.

Figures 21A, 21B:
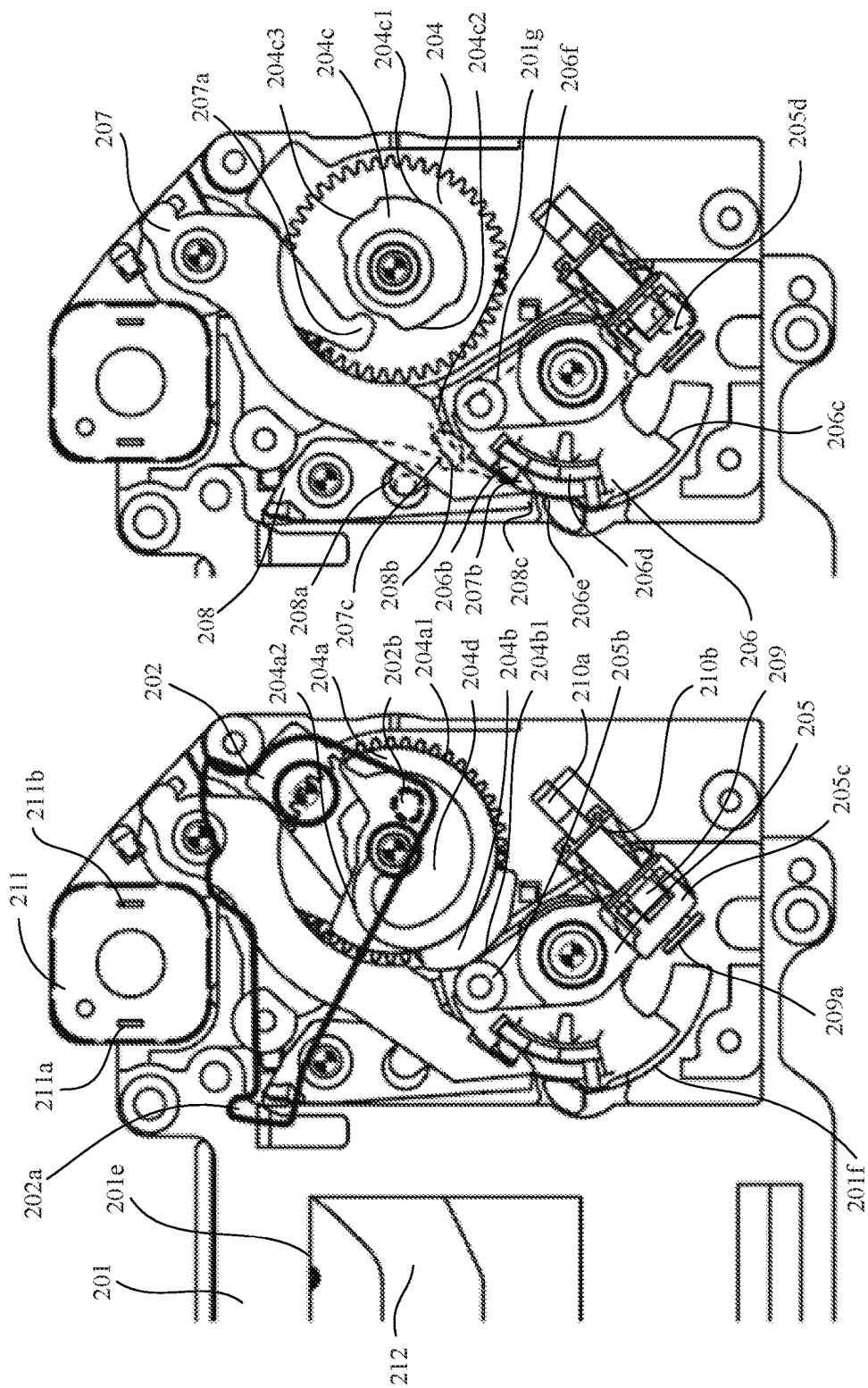
FIGS. 21A and 21B are plane views that illustrate a completion state of a rear curtain charge operation in the live-view imaging mode of the shutter unit according to this embodiment.

The rear curtain charge operation is performed from the angle N to the angle A, and the live-view charge completion state illustrated in FIGS. 21A and 21B is obtained. Since the engaging member 207b locks the locked part 206b at this time, the blade return operation of the blade lever 206 is restrained, and the rear curtain blade unit 212 maintains the state of covering the opening 201e in the shutter base plate 201. In other words, although the live-view state and the live-view charge completion state have the same phase, the rear curtain blade unit 212 has different opening/closing states.

A description will now be given of the voltage applied to the motor 211 in a section from the angle I to the angle A. Initially, the voltage V41 is applied so as to forwardly rotate the motor 211. The driving force of the motor 211 is transmitted to the cam gear 204 via the gear train 213, and the cam gear 204 forwardly rotates. When the cam gear 204 has a state of the angle O, the voltage applied to the motor 211 is changed to the voltage V42. When the cam gear 204 has a state of the angle A, the cam gear 204 stops in the live-view charge completion phase by applying the short brake to the motor 211.

The following relationship is established between the absolute value of the voltage V41 and the absolute value of the voltage V42.

|V41|>|V42|

Due to this voltage control, an overrun of the cam gear 204 when the motor 211 stops, is smaller than that when the same voltage is applied to the motor 211. In other words, since a range of the live-view charge completion phase can be set narrow, a free running time in the next post-live-view-charge opening release operation can be set small and the frame rate can be accelerated. After the live-view charge operation is completed, the post-live-view-charge opening release operation is performed as follows.

Post-Live-View-Charge Opening Release Operation

The armature 209 and yoke 210a absorb each other when the coil 210b is electrified in the live-view charge completion state (state in FIGS. 21A and 21B). When the cam gear 204 is reversely rotated, the cam gear 204 moves to the angle A, the angle O, the angle N, the angle M, the angle L, and the angle K in this order. The overcharge state of the rear curtain driving lever 205 is released (discharge operation) is performed in the section from the angle A to the angle N. The unfixing operation (unlock operation) is performed from the angle M to the angle K.

Figures 23A, 23B:
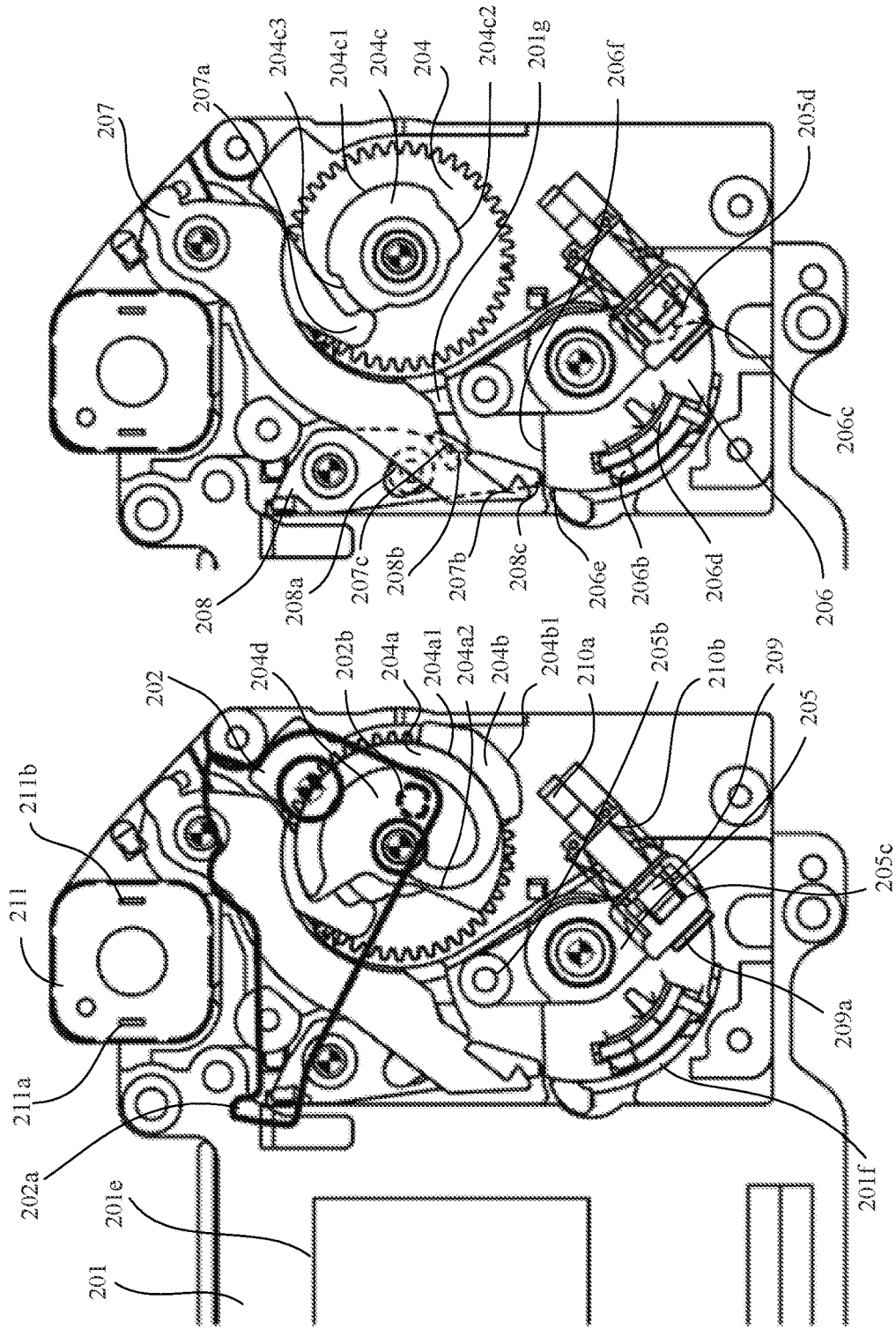
FIGS. 23A and 23B are plane views that illustrate that the blade return is completed and the bound lock operation is effective in the opening release operation in the post-live-view-charge opening release operation of the shutter unit according to this embodiment.

FIGS. 22A and 22B illustrate the state of the angle large J. As the cam follower 207a traces the fixing cam 204c in FIG. 22B, the fixing lever 207 rotates clockwise and the engaging member 207b comes off from the locked member 206b. FIGS. 23A and 23B illustrate the state of the angle K in which the blade return operation and the bound lock operation are performed.

A description will now be given of the voltage applied to the motor 211 in the section from the angle A to the angle K.

Initially, the voltage V51 is applied so as to reversely rotate the motor 211. The driving force of the motor 211 is transmitted to the cam gear 204 via the gear train. 213, and the cam gear 204 reversely rotated. When the cam gear 204 has a state of the angle M, the voltage applied to the motor 211 is changed to the voltage V52. When the cam gear 204 has a state of the angle K, the cam gear 204 stops with the bound lock standby phase (second phase) by applying the short brake to the motor 211.

The following relationship is established between the absolute value of the voltage V51 and the absolute value of the voltage V52.

|V51|>|V52|

Due to this voltage control, an overrun of the cam gear 204 when the motor 211 stops, is smaller than that when the same voltage is applied to the motor 211. In other words, since the bound lock standby phase range can be set small and the free running time in the following driving with the voltage V61 is short, the frame rate can be accelerated.

Figure 24:
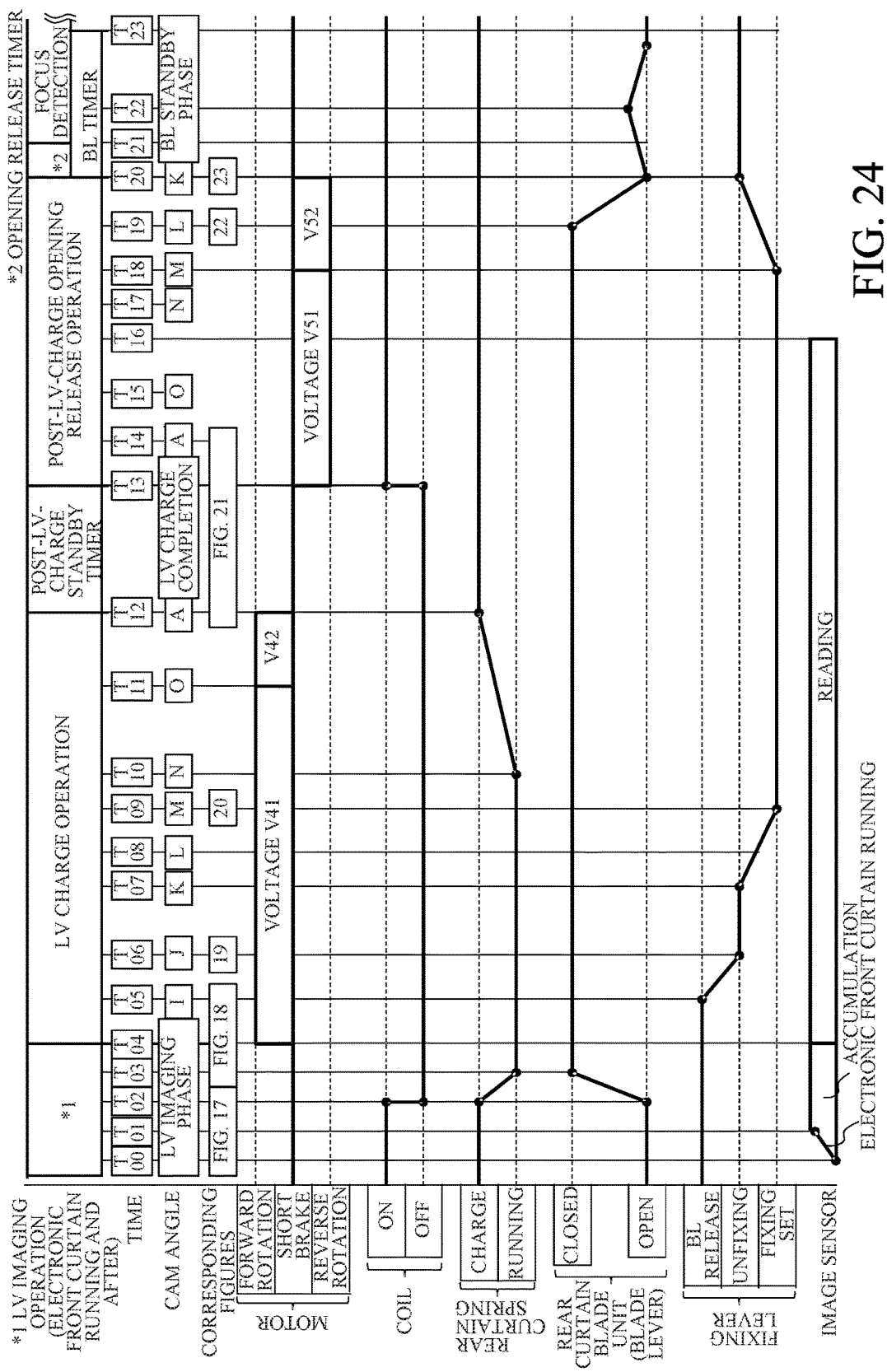
FIG. 24 is a timing chart from an electronic front curtain running in the live-view imaging to the opening release operation after the live-view charge of the shutter unit according to this embodiment.

Referring now to FIG. 24, a description will be given of a relationship between the application start timing of the voltage V51 and the electric charge reading from the image sensor 23. FIG. 24 is a timing chart from the electronic front curtain running to the post-live-view-charge opening release operation in the live view imaging. FIG. 24 illustrates figure numbers corresponding cam angles that depend on time, and the cam angle corresponds to that in FIGS. 7A AND 7B. FIG. 24 also illustrates the state of each element. The state of each element includes the electrification state of the motor 211, the electrification state of the coil 210b, whether or not the rear curtain driving spring Sp2 is charged, whether the rear curtain blade unit 212 closes or opens the opening 210e, the state of the fixing lever 207, and the state of the image sensor 23.

The electronic front curtain running starts for the image sensor 23 at time T00, and the electronic front curtain running is completed at time T01. When the electrification of the coil 210b is cut at time T02, the running operation of the rear curtain blade unit 212 is performed and the running operation of the rear curtain blade unit 212 is completed at time T03.

The electronic charge accumulation for the image sensor 23 is completed and the electric charge reading starts at time T04. In order to absorb scattering of time for the running operation of the rear curtain blade unit 212 or the scattering of the time T03, the time T04 is set shorter than the time T03. The live-view charge operation starts at time T04, and the application of the voltage V41 to the motor 211 in the forward rotation direction starts.

The voltage applied to the motor 211 is switched from the voltage V41 to the voltage V42 at time T11, and the short brake is applied to the motor 211 at time T12. The standby is maintained for a predetermined time period from the time T12 to time T13. This standby time period will be referred to as a post-live-view-charge standby time (first predetermined time).

The post-live-view-charge opening release operation starts at the time T13, and the voltage V51 is applied so as to reversely rotate the motor 211. The electric charge reading from the image sensor 23 is completed at time T16. As understood from a chart of the rear curtain blade unit in FIG. 24, the rear curtain blade unit 212 has a state for closing the opening 201e in the shutter base plate 201 in the overall period in the electric charge reading from the image sensor 23.

The voltage applied to the motor 211 at time T18 is switched from the voltage V51 to the voltage V52, and the short brake is applied to the motor 211 at time T20. In addition, the unfixing operation (unlock operation) starts at the time T18. As described with reference to FIGS. 22A and 22B, the blade return operation starts in which the engaging member 207b comes off from the locked member 206b and the rear curtain blade unit 212 moves from the closed state to the open state at time T19. At time T20, the rear curtain blade unit 212 is in the open state. The rear curtain blade unit 212 is in the open state at time T20, and then bounds. The blade lever 206 contacts the bound lock lever 208 at time T22.

The operation at time T20 or later is different according to the focus mode of the camera 1. The focus mode includes a one-shot mode and a serve mode. The one-shot mode is a continuous capturing mode while the focus lens 53 in the interchangeable lens 5 is fixed. The servo mode is a mode used for the focus detection in the continuous capturing and used to drive the focus lens 53 according to the focus detecting result. When the focus mode is the one-shot mode, the standby is provided by the bound lock time (second predetermined time) from the time T20 to the time T23. A detailed description of the bound lock time will be described later. FIG. 24 illustrates that a bound of the rear curtain blade unit 212 is converged at the time T23.

Where the focus mode is the servo mode, the focus detection using the image sensor 23 is performed an opening release time (third predetermined time) from the time T20 to the time T21 after the standby. As soon as the open release time is completed or at the instant of the time T21, the bound of the rear curtain blade unit 212 does not converge. However, since the rear curtain blade unit 212 bounds outside the opening 201e in the shutter base plate 201, the bound does not affect the focus detection using the image sensor 23.

As described above, in FIG. 24, in the overall period in the electric charge reading from the image sensor 23, the rear curtain blade unit 212 closes the opening 201e in the shutter base plate 201. However, the electric charge reading occurs after the time T20, for example, the rear curtain blade unit 212 starts opening the opening 210e and the noise may occur in the captured image in the electric charge reading. The noise can be avoided by properly setting the post-live-view-charge standby time.

Thus, in this embodiment, the controller 70 completes the electric charge reading from the image sensor 23 after charging the first urging member by rotating the motor 211 in the first direction and before releasing the exposure opening 201e by rotating the motor 211 in the second direction reverse to the first direction. In other words, the controller 70 completes the electric charge reading from the image sensor 23 before the unlock operation (before stopping the rotation of the motor 211 in the second direction). The controller 70 may start the electric charge reading from the image sensor 23 with starting the charge operation (at the time T04), and may complete the electric charge reading before starting the unlock operation while the motor 211 is rotated in the second direction (at the time T16 prior to the time T18). The controller 70 may continuously provide the discharge operation and the unlock operation without stopping the motor 211 between the discharge operation and the unlock operation. The controller 70 may provide a warning when the controller 70 does not complete the electronic charge reading from the image sensor 23 before the unlock operation.

Figure 25:
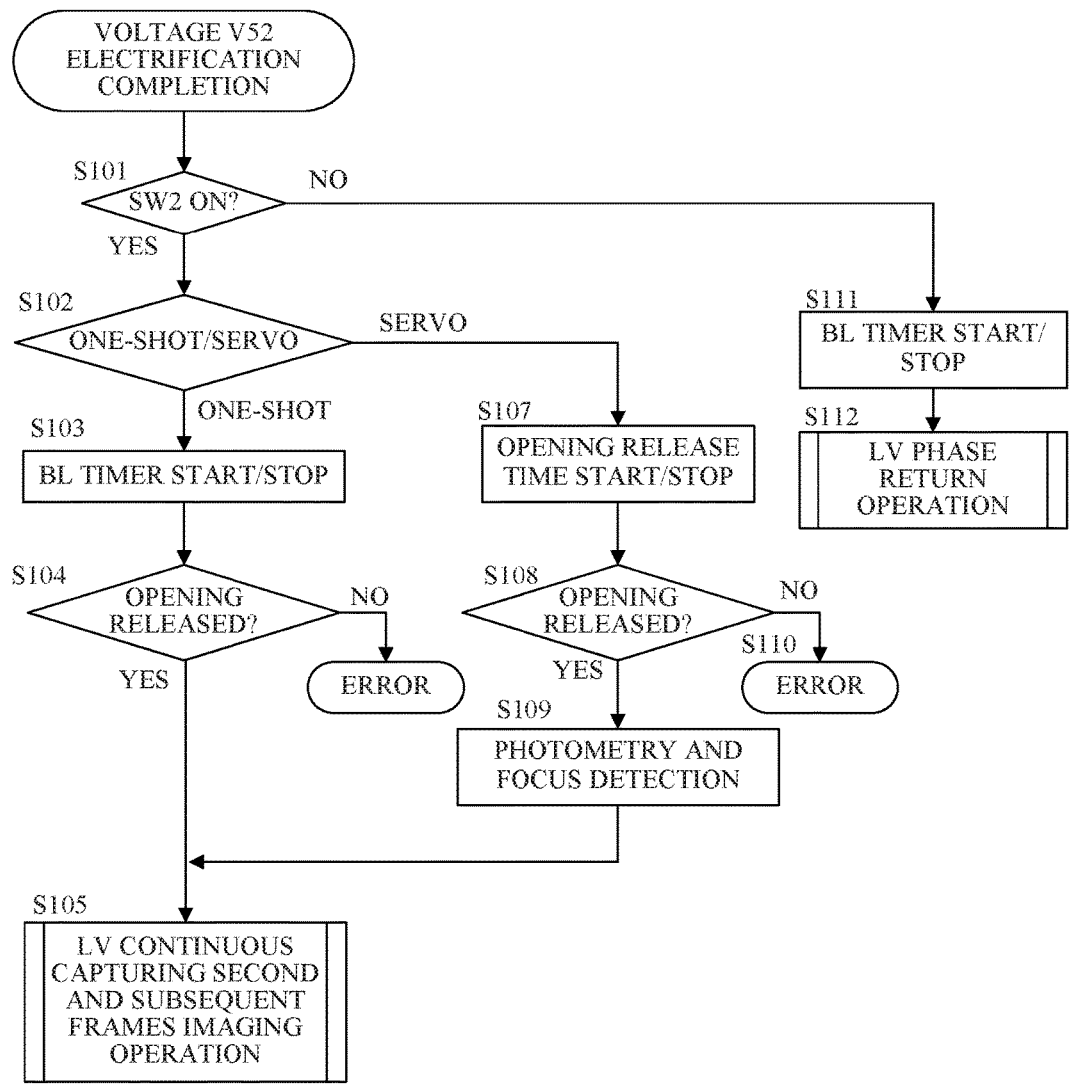
FIG. 25 is a flowchart that illustrates an operational branch after the opening release operation is completed after the live-view charge of the shutter unit according to this embodiment.

Referring now to FIG. 25, a description will be given of the operation after the post-live-view-charge opening release operation is completed. FIG. 25 is a flowchart illustrating the operational branch after the post-live-view-charge opening release operation is completed or after the electrification of the voltage V52 to the motor 211 is completed. Each step in FIG. 25 is mainly executed by the commands from the controller 70 in the camera 1.

When the electrification of the voltage V52 to the motor 211 is completed (or when the electrification of the voltage V52 is completed), the controller 70 determines in the step S101 whether the release button 31 has been fully pressed or whether the signal SW2 is input. When the release button 31 is fully pressed or SW2 is input, the flow moves to the step S102. On the other hand, when SW2 is not input, the flow moves to the step S111.

In the step S102, the controller 70 determines whether the setting in the focus mode in the camera 1 is a one-shot mode or a servo mode. When the setting of the camera 1 is the one-shot mode, the flow moves to the step S103. On the other hand, when the setting of the camera 1 is the servo mode, the flow moves to the step S107.

In the step S103, the controller 70 starts measuring the bound lock time and moves to the step S104 after the bound look time has passed. The bound lock time is a standby time for assuring the bound lock operation. Next, in the step S104, the controller 70 determines whether or not the opening 201e in the shutter base plate 201 is opened. This determination is performed by detecting the position of the blade lever 206 based on the output of the photo-interrupter 215. When determining that the opening 201e is opened, the controller 70 moves to the step S105 and performs the live-view continuous second and subsequent frames capturing operation. On the other hand, when determining that the opening 201e has not yet been opened due to any reasons, the controller 70 moves to the step S106 and displays an error on the display monitor 26.

Next follows a description of a process when the setting of the focus mode of the camera 1 is the servo mode in the step S102. Initially, in the step S107, the controller 70 starts measuring the opening release time, and moves to the step S108 after the opening release time has elapsed. In starting this flow (in the step S102), the electrification to the motor 211 ends for the unfixing operation in FIGS. 7A AND 7B. In other words, the unfixing operation has been completed, but even when the unfixing operation has been completed, there is a time lag until the blade return operation for opening the opening 201e in the shutter blade 201 ends. The opening release time is set longer than this time lag.

In the step S108, the controller 70 determines whether the opening 201e in the shutter base plate 201 is opened, similar to the step S104. When determining that the opening 201e is released, the controller 70 moves to the step S109. On the other hand, when determining that the opening 201e is not opened, the controller 70 moves to the step S110 and displays an error on the display monitor 26. In the step S109, the controller 70 controls the image sensor 23 for the photometry and the focus detection. When the photometry and the focus detection are completed with the image sensor 23, the flow moves to the step S105.

Since a sum of the opening release time and the time necessary for the photometry and the focus detection is much longer than the bound lock time in the servo mode, the bound lock time is not set. When the SW2 is not input or the release button is not fully pressed in the step S101, the flow moves to the step S111 and the controller 70 starts measuring the bound lock time. After the bound lock time elapses, the controller 70 moves to the step S112 for the live-view phase return operation. In the servo mode, the focus detection is performed and thus the continuous capturing frame rate becomes lower than that in the one-shot mode. However, a drop of the frame rate can be restrained as little as possible in the servo mode by setting the opening release time shorter than the bound lock time.

Live-View Continuous Second and Subsequent Frames Capturing Operation

Figures 26A, 26B:
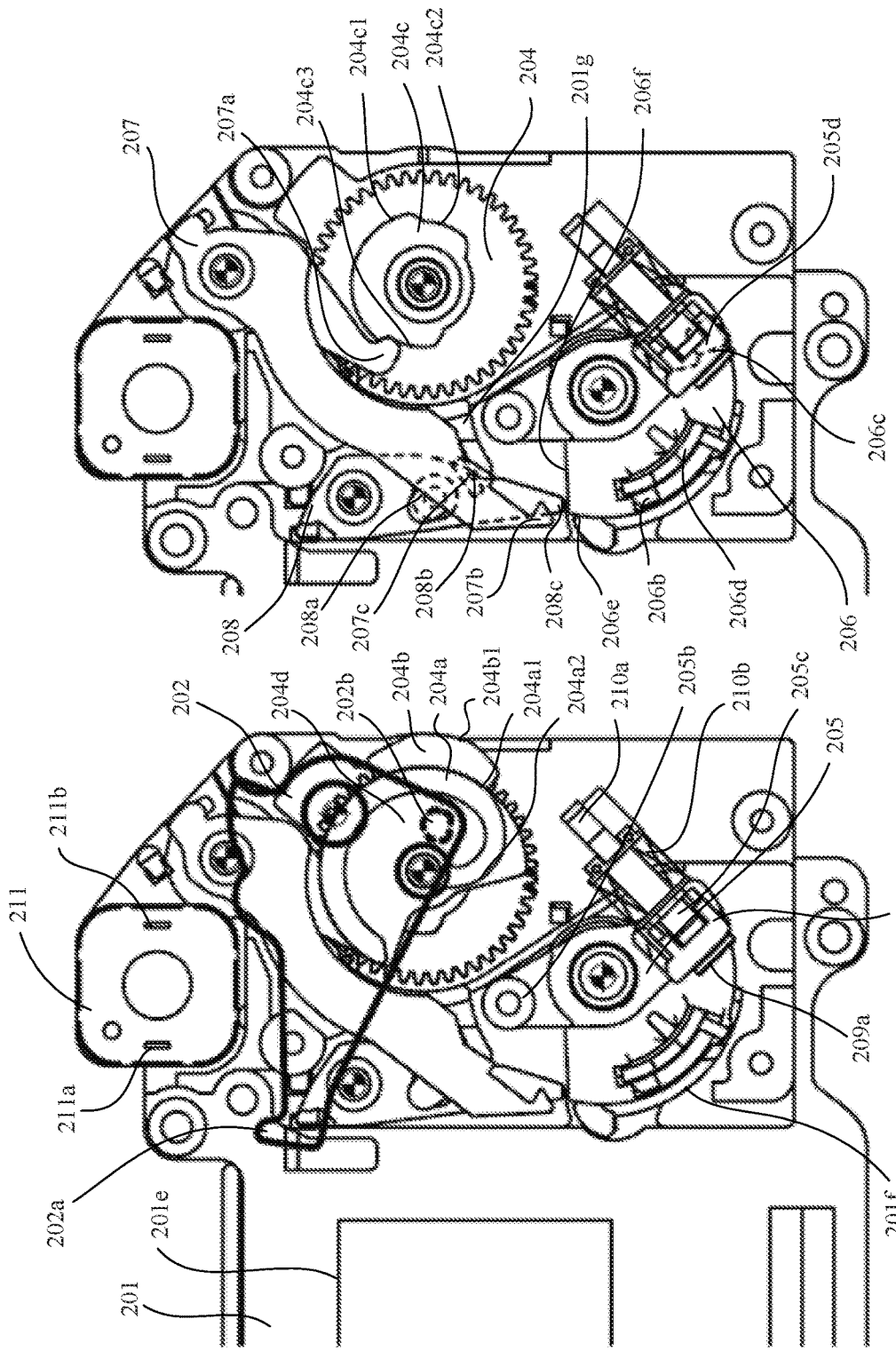
FIGS. 26A and 26B are plane views that illustrate that the cam gear is located at the terminal of the bound rock phase in continuous second and subsequent frames capturing operation in the live-view imaging mode of the shutter unit according to this embodiment.

When the cam gear 204 is reversely rotated from the state in FIGS. 23A and 23B, the cam gear moves to the angle J and the angle I in this order. FIGS. 26A and 26B illustrate the state of the angle J. The cam follower 207a traces an end of the second cam surface 204c3 in FIGS. 26A and 26B. In other words, the fixing lever 207 does not move between the angle K (in FIGS. 23A and 23B) and the angle K (in FIGS. 26A and 26B). The bound unlock operation is performed from the angle J to the angle I, and the pre-running standby state is obtained in the live-view mode illustrated in FIGS. 18A and 18B.

As understood based on the above description, the start state is different between the live-view first-frame imaging operation and the live-view continuous second and subsequent frames capturing operation (live-view state/bound lock standby phase) but finally the state in FIGS. 17A and 17B is obtained. Even in the live-view continuous second and subsequent frames capturing operation, similar to the live-view first-frame imaging operation, the electronic front curtain running and the running operation are performed in the state in FIGS. 17A and 17B, and the running completion state in the live-view mode illustrated in FIGS. 18A and 18B is obtained. Thus, the live-view continuous second and subsequent frames capturing operation is completed.

After the live-view continuous second and subsequent frames capturing operation is completed is completed, the live-view charge operation is performed, A description will now be given of the voltage applied to the motor 211 in the section from the angle J to the angle I. Initially, the voltage V61 is applied so as to reversely rotate the motor 211. When the cam gear 204 has a state of the angle J, the voltage applied to the motor 211 is switched to the voltage V62. When the cam gear 204 has a state of the angle G, the cam gear 204 stops with the live-view imaging phase by applying a short brake to the motor 211.

The following relationship is established between the absolute value of the voltage V61 and the absolute value of the voltage V62.

$|V61|>|V62|$

Due to this voltage control, an overrun of the cam gear 204 when the motor 211 stops, is smaller than that when the same voltage is applied to the motor 211. In other words, a range of the live-view imaging phase can be set small, and the design freedoms of the second mirror cam surface 204a2 and the concave 204d. In addition, the free running time in the live-view charge operation becomes shorter and the frame rate can be accelerated. These effects are the same as those of the live-view first-frame imaging operation.

As illustrated in FIGS. 7A AND 7B, the section for electrifying the motor 211 in the live-view continuous second and subsequent frames capturing operation is a very small section from the bound lock standby phase to the live-view imaging phase. Since a period is short from when the live-view continuous second and subsequent frames capturing operation starts to when the electronic front curtain running is performed or the release time lag for the second frame is short, the frame rate can be improved. In addition, a short release time lag for the second frame means a short time period from when the focus detection is completed to when the electronic front curtain running starts. Thus, the focus detection accuracy improves in the servo mode.

Live-View Phase Return Operation

When the cam gear 204 is forwardly rotated from the state in FIGS. 23A and 23B, the cam gear moves to the angles K, L, M, N, O, and A in this order. A description will now be given of the voltage applied to the motor 211 in the section from the angle K to the angle A. Initially, the voltage V71 is applied so as to forwardly rotate the motor 211. When the cam gear 204 has a state of the angle O, the voltage applied to the motor 211 is switched to the voltage V72. When the cam gear 204 has a state of the angle A, the cam gear 201 stops with the live-view charge completion phase by applying a short brake to the motor 211.

The following relationship is established among the absolute value of the voltage V71, the absolute value of the voltage V72, and the absolute value of the voltage V41.

|V71|>|V72| and |V41|>|V71|

When the relationship of |V71|>|V72| is satisfied, an overrun of the cam gear 204 when the motor 211 stops, is smaller than that when the same voltage is applied to the motor 211. In other words, the live-view charge completion phase range can be set small. The rear curtain charge operation is performed in which the charge load of the rear curtain driving spring Sp2 is applied in the section in which the voltage V41 is applied or in the live-view charge operation. On the other hand, since the armature 209 and yoke 210a absorb each other in the section for applying the voltage V71, the charge load of the rear curtain driving spring Sp2 is not applied or the electrification starts to the coil 210b when the post-live-view opening release operation starts. Thus, the voltage V71 can be set smaller than the voltage V41. Since the voltage V71 can be set small, the operation can be quieter.

This embodiment can improve the frame rate in the live-view mode and the focus detection accuracy in the servo mode continuous capturing while corresponding to both of the finder imaging mode and the live-view imaging mode, by a simple configuration using a single motor. This embodiment can change the magnitude of the voltage or the effective value of the voltage through the known PWM control.

This embodiment can restrain the imaging speed from dropping in the continuous capturing in the live-view.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-221118, filed on Nov. 14, 2016, which is hereby incorporated by reference herein in its entirety.

What is claimed is:

1. An imaging apparatus comprising:
   a blade member configured to open and close an exposure opening;
   a drive member configured to drive the blade member;
   a first urging member configured to force the blade member, and to change the blade member to a charge state according to a rotation of the drive member;
   a motor configured to drive the drive member;
   an image sensor located at a position corresponding to the exposure opening;
   a controller configured to control the motor and the image sensor;
   a blade moving member configured to move between an open position for opening the exposure opening and a closed position for closing the exposure opening;
   a cam member having a driving cam that contacts the drive member; and
   an engaging member configured to lock the blade moving member at the closed position and operate in association with the cam member,
   wherein the drive member drives the blade moving member so that the blade moving member moves from the open position to the closed position,
   wherein the first urging member changes the blade member to the charge state when charged as a result of the drive cam contacting the drive member,
   wherein the controller rotates the motor in a first direction as reading of a signal corresponding to first imaging starts for one frame using the image sensor, and changes the blade member to the charge state according to a charging of the first urging member,
   wherein the controller rotates the motor in a second direction reverse to the first direction after a change of the blade member to the charge state by the first urging member is completed, completes reading the signal corresponding to the first imaging before opening the exposure opening, and stops rotating the motor in the second direction,
   wherein the controller performs a charge operation that charges the first urging member by the cam member as a result of the motor being rotated in the first direction, and stops the motor when the cam member has a first phase,
   wherein the controller provides a releasing operation that rotates the motor in the second direction after standing by a first predetermined time after the charge operation is completed, and stops the motor when the cam member has a second phase, wherein the releasing operation includes a discharge operation that releases the charge of the first urging member, and an unlock operation that unlocks the blade moving member at the closed position by the engaging member after the discharge operation, wherein the blade member closes the exposure opening from when the charge operation starts to when the unlock operation starts, and wherein the controller completes electric charge reading from the image sensor before the unlock operation starts.

2. The imaging apparatus according to claim 1, wherein the controller continuously performs the discharge operation and the unlock operation without stopping the motor between the discharge operation and the unlock operation.

3. The imaging apparatus according to claim 1, further comprising a restricting member movable between a restricting position for restricting a movement of the blame moving member from the open position to the closed position and a release position for releasing a restriction, wherein the restricting member enters a moving locus of the blade moving member when the releasing operation is completed, and wherein the controller stands by a second predetermined time after the releasing operation is completed.

4. The imaging apparatus according to claim 3, wherein the controller stands by a third predetermined time period after the releasing operation is completed, and then provides a focus detection using the image sensor.

5. The imaging apparatus according to claim 4, wherein the third predetermined time is shorter than the second predetermined time period.

6. The imaging apparatus according to claim 4, wherein the cam member has a third phase when the motor rotates in the second direction after the cam member stands by for the second predetermined time, and wherein the restricting member retreats from the moving locus of the blade moving member in the third phase.

7. The imaging apparatus according to claim 1, further comprising a release switch for instructing an imaging start, wherein the controller determines whether or not the imaging start is instructed via the release switch after the releasing operation is completed, rotates the motor in the first direction when the imaging start is not instructed, performs a phase return operation for stopping the motor when the cam member has the first phase.

8. The imaging apparatus according to claim 7, wherein a voltage applied to the motor in the charge operation is higher than a voltage applied to the motor in the phase return operation.

9. The imaging apparatus according to claim 1, wherein the controller controls the motor so as to provide a standby time while the motor rotates from the first direction to the second direction, so that the reading of the signal corresponding to the first imaging is completed after a rotation of the motor is changed from the first direction to the second direction.

10. The imaging apparatus according to claim 1, further comprising:

a mirror drive member movable between a first position and a second position;

a cam follower provided to the mirror drive member; and a second urging member configured to force the mirror drive member so that the mirror drive member is located at the first position, wherein the cam member includes a mirror cam that contacts the cam follower, the cam follower contacting the mirror cam where the motor rotates in the first direction, the mirror drive member moving to the second position when the second urging member is charged, the cam follower being inserted into a concave in the mirror cam where the motor is rotated in the second direction reverse to the first direction, the mirror drive member maintaining the first position when the cam follower is forced against the second urging member.

11. The imaging apparatus according to claim 1, wherein the controller provides a predetermined warning to a user where the electric charge reading from the image sensor is not completed before the unlock operation.

12. A control method for an imaging apparatus that includes a blade member configured to open and close an exposure opening, a drive member configured to drive the blade member, a first urging member configured to force the blade member, and to change the blade member to a charge state according to a rotation of the drive member, a motor configured to drive the drive member, an image sensor located at a position corresponding to the exposure opening, a controller configured to control the motor and the image sensor, a blade moving member configured to move between an open position for opening the exposure opening and a closed position for closing the exposure opening, a cam member having a driving cam that contacts the drive member, and an engaging member configured to lock the blade moving member at the closed position and operate in association with the cam member, the control method comprising the steps of controlling the motor and the image sensor, wherein the controlling step rotates the motor in a first direction as reading of a signal corresponding to first imaging starts for one frame using the image sensor, and changes the blade member to the charge state according to a charging of the first urging member, wherein the controlling step rotates the motor in a second direction reverse to the first direction after a change of the blade member to the charge state by the first urging member is completed, completes reading the signal corresponding to the first imaging before opening the exposure opening, and stops rotating the motor in the second direction, and wherein the control method further comprises:

driving, by the drive member, the blade moving member so that the blade moving member moves from the open position to the closed position;

changing, by the first urging member, the blade member to the charge state when charged as a result of the drive cam contacting the drive member;

performing, by the controller, a charge operation that charges the first urging member by the cam member as a result of the motor being rotated in the first direction, and stops the motor when the cam member has a first phase;

providing, by the controller, a releasing operation that rotates the motor in the second direction after standing by a first predetermined time after the charge operation is completed, and stops the motor when the cam member has a second phase, wherein the releasing operation includes a discharge operation that releases the charge of the first urging member, and an unlock operation that unlocks the blade moving member at the closed position by the engaging member after the discharge operation;

closing, by the blade member, the exposure opening from when the charge operation starts to when the unlock operation starts; and completing, by the controller, an electric charge reading from the image sensor before the unlock operation starts.

13. A non-transitory computer-readable storage medium that stores a program for causing a computer to execute each process of a method for controlling an imaging apparatus that includes a blade member configured to open and close an exposure opening, a drive member configured to drive the blade member, a first urging member configured to force the blade member, and to change the blade member to a charge state according to a rotation of the drive member, a motor configured to drive the drive member, and an image sensor located at a position corresponding to the exposure opening, a controller configured to control the motor and the image sensor, a blade moving member configured to move between an open position for opening the exposure opening and a closed position for closing the exposure opening, a cam member having a driving cam that contacts the drive member, and an engaging member configured to lock the blade moving member at the closed position and operate in association with the cam member, the control method comprising the steps of controlling the motor and the image sensor, wherein the controlling step rotates the motor in a first direction as reading of a signal corresponding to first imaging starts for one frame using the image sensor, and changes the blade member to the charge state according to a charging of the first urging member, wherein the controlling step rotates the motor in a second direction reverse to the first direction after a change of the blade member to the charge state by the first urging member is completed, completes reading the signal corresponding to the first imaging before opening the exposure opening, and stops rotating the motor in the second direction and wherein the control method further comprises:

driving, by the drive member, the blade moving member so that the blade moving member moves from the open position to the closed position;

changing, by the first urging member, the blade member to the charge state when charged as a result of the drive cam contacting the drive member;

performing, by the controller, a charge operation that charges the first urging member by the cam member as a result of the motor being rotated in the first direction, and stops the motor when the cam member has a first phase;

providing, by the controller, a releasing operation that rotates the motor in the second direction after standing by a first predetermined time after the charge operation is completed, and stops the motor when the cam member has a second phase, wherein the releasing operation includes a discharge operation that releases the charge of the first urging member, and an unlock operation that unlocks the blade moving member at the closed position by the engaging member after the discharge operation;

closing, by the blade member, the exposure opening from when the charge operation starts to when the unlock operation starts; and completing, by the controller, an electric charge reading from the image sensor before the unlock operation starts.

* * * * *